United States Patent [19]
Oldenkamp

[11] Patent Number: 6,151,234
[45] Date of Patent: Nov. 21, 2000

[54] APPARATUS FOR CONVERTING A DIRECT CURRENT INTO AN ALTERNATING CURRENT

[76] Inventor: Hendrik Oldenkamp, Niouwstraat 29, 5611 DA Eindhoven, Netherlands

[21] Appl. No.: 09/519,806

[22] Filed: Mar. 6, 2000

[51] Int. Cl.[7] .................................................. H02M 7/5387
[52] U.S. Cl. .......................................... 363/132; 323/268
[58] Field of Search ............................ 323/268; 363/132, 363/65; 307/71

[56] References Cited

U.S. PATENT DOCUMENTS

| | | | |
|---|---|---|---|
| 4,698,738 | 10/1987 | Miller et al. | 363/65 |
| 5,548,504 | 8/1996 | Takehara | 363/65 |
| 5,566,060 | 10/1996 | Shimmer et al. | 363/65 |

FOREIGN PATENT DOCUMENTS

| | | |
|---|---|---|
| 0 594 908 | 5/1994 | European Pat. Off. . |
| 196 35 606 | 3/1998 | Germany . |
| 2 265 502 | 9/1993 | United Kingdom . |

Primary Examiner—Shawn Riley
Attorney, Agent, or Firm—Westman, Champlin & Kelly, P.A.; S. Koehler

[57] ABSTRACT

An apparatus for converting a direct current into an alternating current comprises a direct-current converter having an input and an output, which direct-current converter is continuously controllable, a capacitor, and a control unit for controlling the direct-current converter. The apparatus furthermore comprises a second direct-current converter having an input and an output, wherein the input of the second direct-current converter is connected in parallel to the input of the first direct-current converter and the outputs of the first and the second direct-current converter are connected in series. An unfolding bridge is connected to the series-connected outputs of the direct-current converters, whilst the capacitor is connected to the output of the second direct-current converter. Furthermore, a first switching element is provided for interrupting the series connection and a second switching element is provided for connecting the unfolding bridge to the output of the first direct-current converter in the interrupted state of the series connection. The control unit controls at least the first switching element in dependence on the voltage $V_c$ across the capacitor and the voltage $V_{abs}$ across the unfolding bridge, in such a manner that the first switching element is opened when $V_{abs} < V_c$.

6 Claims, 29 Drawing Sheets

Voltage, secondary

Voltage, secondary

Current, secondary

Current, secondary

Current, primary

Power

Power

Voltage, secondary

Voltage, secondary

Current, secondary

Current, secondary

Current, primary

Power

Power

Voltage, secondary

Voltage, secondary

Current, secondary

Current, secondary

Current, primary

Power

Power

Voltage, secondary

APPARATUS FOR CONVERTING A DIRECT CURRENT INTO AN ALTERNATING CURRENT

BACKGROUND OF THE INVENTION

The invention relates to an apparatus for converting a direct current into an alternating current, comprising a direct-current converter having an input and an output, which direct-current converter is continuously controllable, a capacitor, a control unit for controlling the direct-current converter, and an unfolding bridge.

An apparatus of this kind is known in various embodiments thereof. When direct-current is being converted into alternating current, the current and the voltage on the direct-current side of the converter must be practically constant, and consequently also the power is practically constant. On the alternating current side of the converter the current and the voltage are sinusoidal, so that the momentaneous power depends on the time in that case and assumes values between zero and twice the average power. This is only possible if it is possible to store energy in the direct-current converter.

A prior art solution for the storage of energy in the direct-current converter of the type referred to above is to connect a capacitor to the direct-current side of the converter. The unfolding bridge is connected to the alternating current side and ensures that the output voltage of the direct-current converter will be positive at all times. The output voltage of the direct-current converter thereby equals the absolute value of the ac voltage on the output of the unfolding bridge. With this prior art solution, the switching frequency of the switches in the unfolding bridge is twice the frequency of the ac output voltage, which is usually 50 Hz or 60 Hz, so that the switching losses of the unfolding bridge are negligible, due to the relatively low frequency. The drawback of this prior art solution is that it can only be used in a satisfactory manner if the input direct-current voltage is relatively high. The ripple current and the ripple voltage decrease proportionally to the magnitude of the capacitor of the capacitor. The energy stored in a capacitor is $E=\frac{1}{2}CU^2$. This means that when the input voltage is reduced by a factor k, the capacity of the capacitor must increase by a factor $k^2$ in order to eliminate the ripple to the same degree. This leads to larger dimensions and a higher cost of the capacitor.

An alternative prior art solution for the energy storage is to connect the capacitor to the alternating current side of the direct-current voltage converter, so that the energy storage will take place at a high voltage at all times and the capacitor can remain small. The conversion of direct-current into alternating current will then take place in a second stage. One drawback of this prior art solution is the fact that conversion takes place twice, causing a lower efficiency of the conversion.

The object of the invention is to provide apparatus of the kind referred to in the introduction, wherein the efficiency of the conversion will be high and wherein a relatively small capacitor will suffice.

SUMMARY OF THE INVENTION

In order to accomplish that objective, the apparatus according to the invention is characterized by a second direct-current converter having an input and an output, wherein the input of the second direct-current converter is connected in parallel to the input of the first direct-current converter and the outputs of the first and the second direct-current converter are connected in series, wherein the unfolding bridge is connected to the series-connected outputs of the direct-current converters and the capacitor is connected to the output of the second direct-current converter, wherein a first switching element is provided for interrupting the series connection and a second switching element is provided for connecting the unfolding bridge to the output of the first direct-current converter in the interrupted state of the series connection, wherein the control unit controls at least the first switching element in dependence on the voltage $V_c$ across the capacitor and the voltage $V_{abs}$ across the unfolding bridge, in such a manner that the first switching element is opened when $V_{abs} < V_c$.

In this manner it is achieved that the capacitor is loaded at a high voltage via the second direct-current converter, so that a capacitor of limited dimensions will suffice, even when the input voltages are very low. The capacitor is connected in series to the output of the first direct-current converter for only part of the period of the alternating current, whereby the energy of the capacitor is supplied at least substantially directly to the output. This means that at least substantially the entire power flows through one direct-current converter only once, thus ensuring a high efficiency. In addition, the output voltage on the first direct-current converter is reduced, so that said first direct-current converter can be dimensioned for a lower output voltage. Furthermore, the second direct-current converter can operate at a constant conversion ratio, so that it can be of relatively simple design and have a high efficiency.

BRIEF DESCRIPTION OF THE DRAWINGS

The invention will now be explained in more detail with reference to the drawings, which schematically show a few exemplary embodiments.

DETAILED DESCRIPTION OF THE PREFERRED EMBODIMENTS

Figure 1:
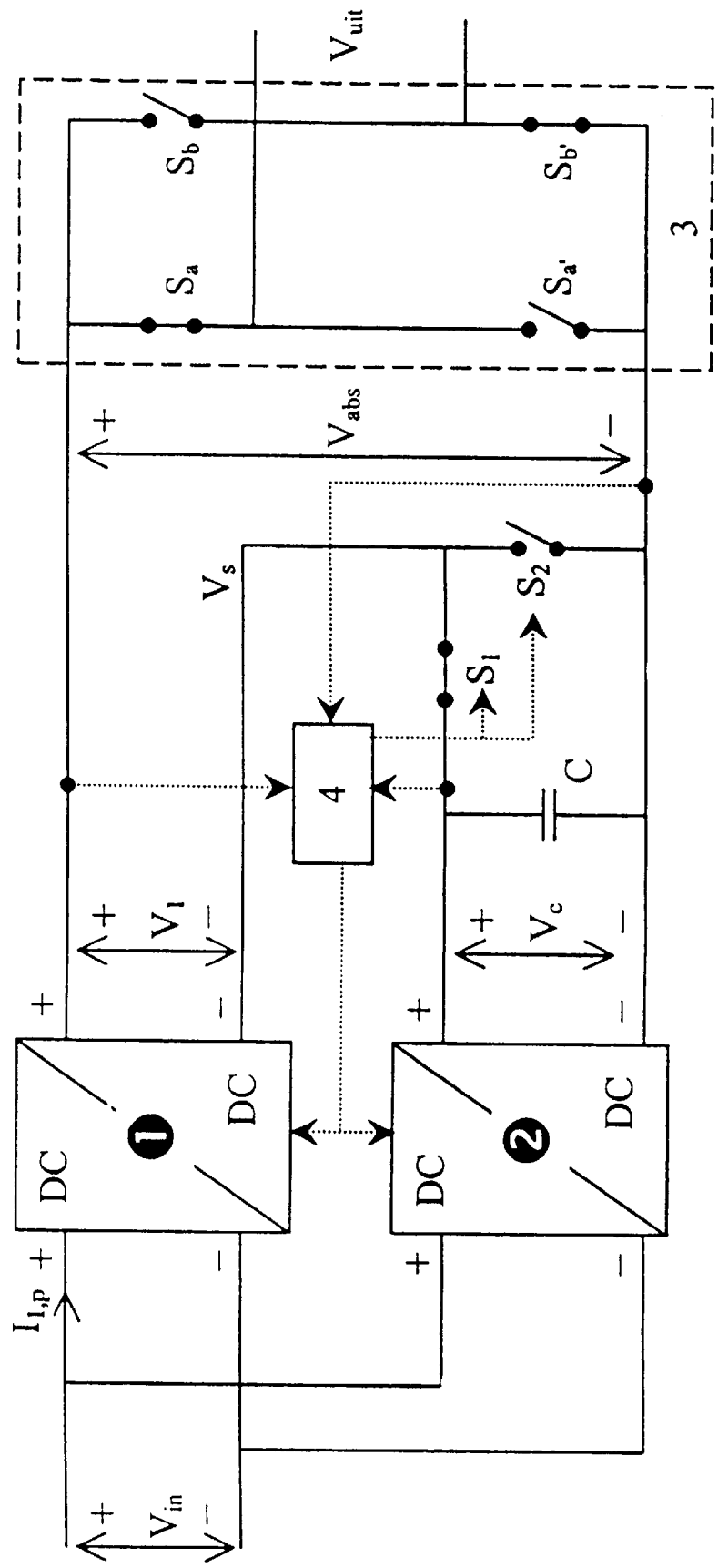
FIG. 1 is a simplified block diagram of a first embodiment of the apparatus according to the invention.

FIG. 1 shows an apparatus for converting a direct current into an alternating current, which apparatus comprises a first direct-current converter 1 and a second direct-current converter 2. As appears from FIG. 1, the inputs of the two direct-current converters 1, 2 are connected in parallel and they can be connected to a direct-current source which provides an input voltage $V_{in}$. The direct-current converters have a common input, as it were. Connected to the output of the direct-current converter 2 is a capacitor C, with the voltage on the output of the direct-current converter 2 and consequently the voltage across capacitor C being indicated at $V_c$. The voltage on the output of direct-current converter 1 is indicated at $V_1$. Since the capacitor is connected to the relatively high output voltage, a relatively small capacity will suffice, and nevertheless a great deal of energy can be stored in the capacitor, so that the ripple voltage and the ripple current will be strongly reduced.

The outputs of the two direct-current converters 1, 2 are connected in series via a switch $S_1$, whereby an unfolding bridge 3 which is known per se and which includes switches $S_a$, $S_{a'}$, $S_b$ and $S_{b'}$, is connected to the series-connected outputs. The alternating current output side of unfolding bridge 3 is indicated at $V_{uit}$. The input voltage of unfolding bridge 3 is indicated at $V_{abs}$ in FIG. 1. Unfolding bridge 3 is controlled in a manner which is known per se. The switches $S_a$, $S_{a'}$, and $S_b$ and $S_{b'}$, are thereby driven so that the unfolding bridge operates as a double-phase rectifier, wherein the current can flow in both directions. Furthermore the invention disclosed herein comprises a switching element $S_2$, by means of which the unfolding bridge can be directly connected to the output of the direct-current converter 1.

The control of the apparatus disclosed herein takes place by means of a control unit 4, wherein the input terminals, at which various voltages that occur in the circuit are measured, and the control connections are indicated in broken lines.

Direct-current converter 1 is a continuously controllable direct-current converter, which is controlled by control unit 4. Unit 4 furthermore controls in any case the switch $S_1$ in dependence on the momentaneous value of the voltages $V_c$ and $V_{abs}$. The switching element $S_2$ may be in the form of a switch controlled by control unit 4 or in the form of a diode, which will be conductive as long as $V_{abs} < V_c$.

The operation of the apparatus which is shown in FIG. 1 will be explained hereafter with reference to FIGS. 4A–4D. FIGS. 1–4 show the relevant currents, voltages and powers. As regards the circuit according to FIGS. 1 and 4 it applies that $P_{ac}=300$ W, $U_{ac}=230$ $V_{eff}$, $f_{ac}=50$ Hz, $C=300$ $\mu F$ and $N=V_c/V_{in}=9$.

Figure 4A:
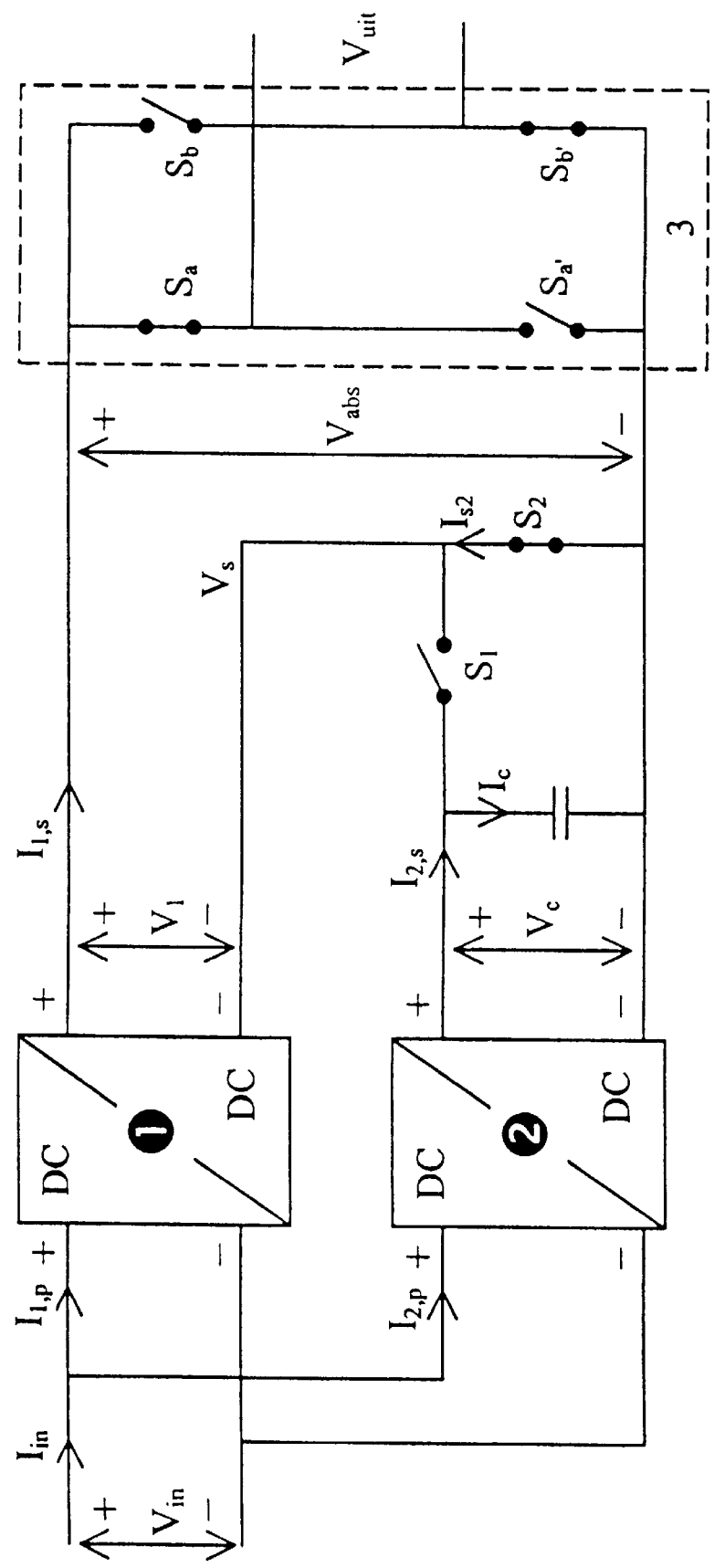
FIGS. 4A–4D show four possible operating states of the apparatus of FIG. 1.

FIG. 4A shows the state of the circuit when $V_{abs} < V_c$. Control unit 4 receives these voltages $V_{abs}$ and $V_c$ and opens switch $S_1$, so that the unfolding bridge 3 is only connected to direct-current converter 1. Direct-current converter 2 supplies power to capacitor C. The momentaneous alternating current power required by the load is smaller than the direct-current power, whereby the current required at the output is supplied by direct-current converter 1 and is exclusively obtained from the direct-current source which is connected to the input. The current supplied to the output is regulated by control unit 4 by controlling the direct-current converter 1. The redundant power is fed to capacitor C via direct-current converter 2. The efficiency of the converter apparatus is high, since the direct-current converter 1 supplies power to unfolding bridge 3 and direct-current converter 2 supplies power to capacitor C.

Figure 4B:
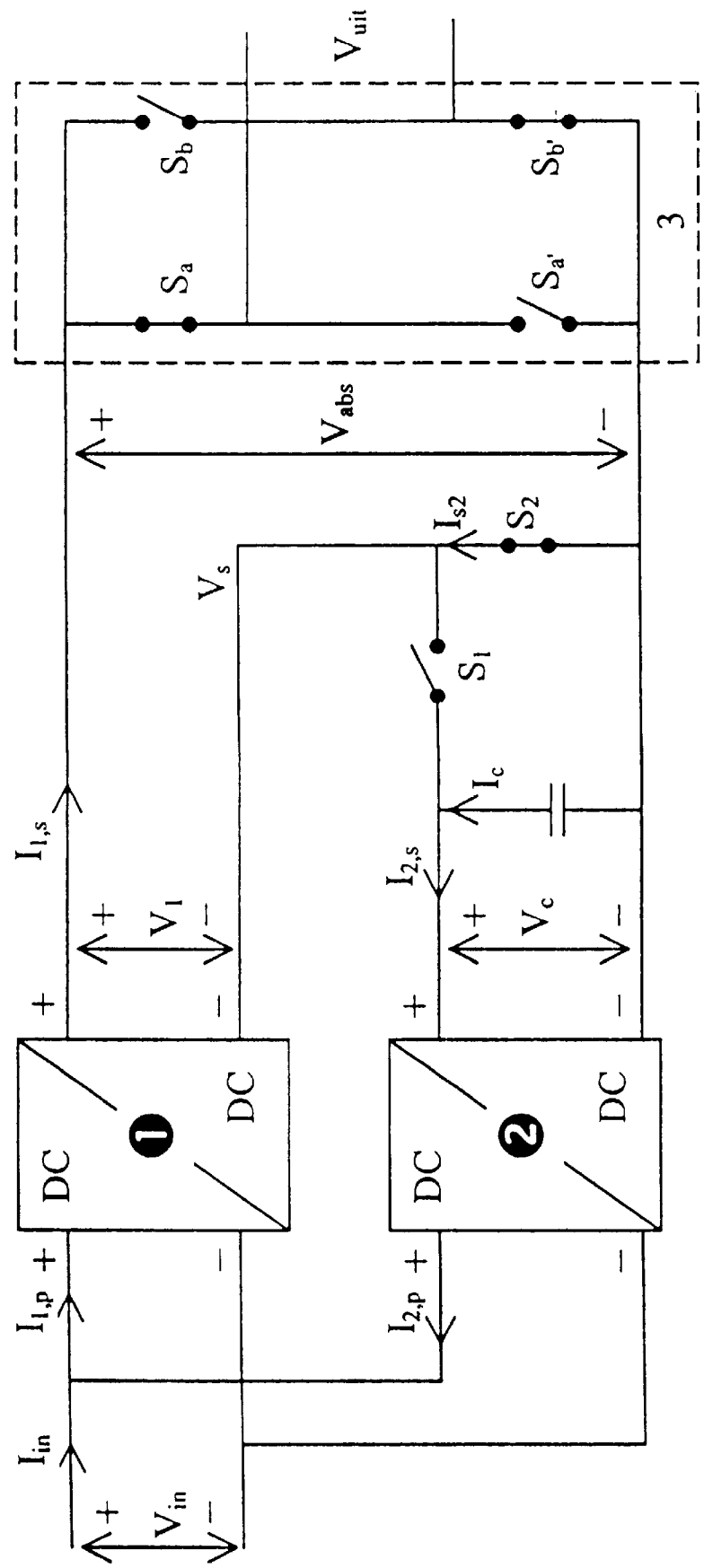

FIG. 4B shows a second possible state of the apparatus according to FIG. 1, wherein the state of switches $S_1$ and $S_2$ is the same as in FIG. 4A. The voltage $V_{abs}$ is still smaller than $V_c$. In this case, however, the required momentaneous alternating current power is larger than the direct-current power that can be supplied by the direct-current source. The current required at the output is still supplied by the direct-current converter 1, but since the power of the direct-current source that is available for this purpose is too small, the amount of power that is lacking is drawn from capacitor C via direct-current converter 2. This means that the efficiency of the converter apparatus is lower than in the state according to FIG. 4A, because part of the power supplied to the output passes through direct-current converter 1 as well as through direct-current converter 2 and has already been supplied to capacitor C via direct-current converter 2. The current supplied to the output is regulated by control unit 4 by controlling direct-current converter 1.

It is noted that this state can only occur when the momentaneous alternating current power required at the output is larger than the available power of the direct-current converter. Naturally it is possible to dimension the apparatus disclosed herein so that the state of FIG. 4B will occur only briefly, if at all.

Figure 4C:
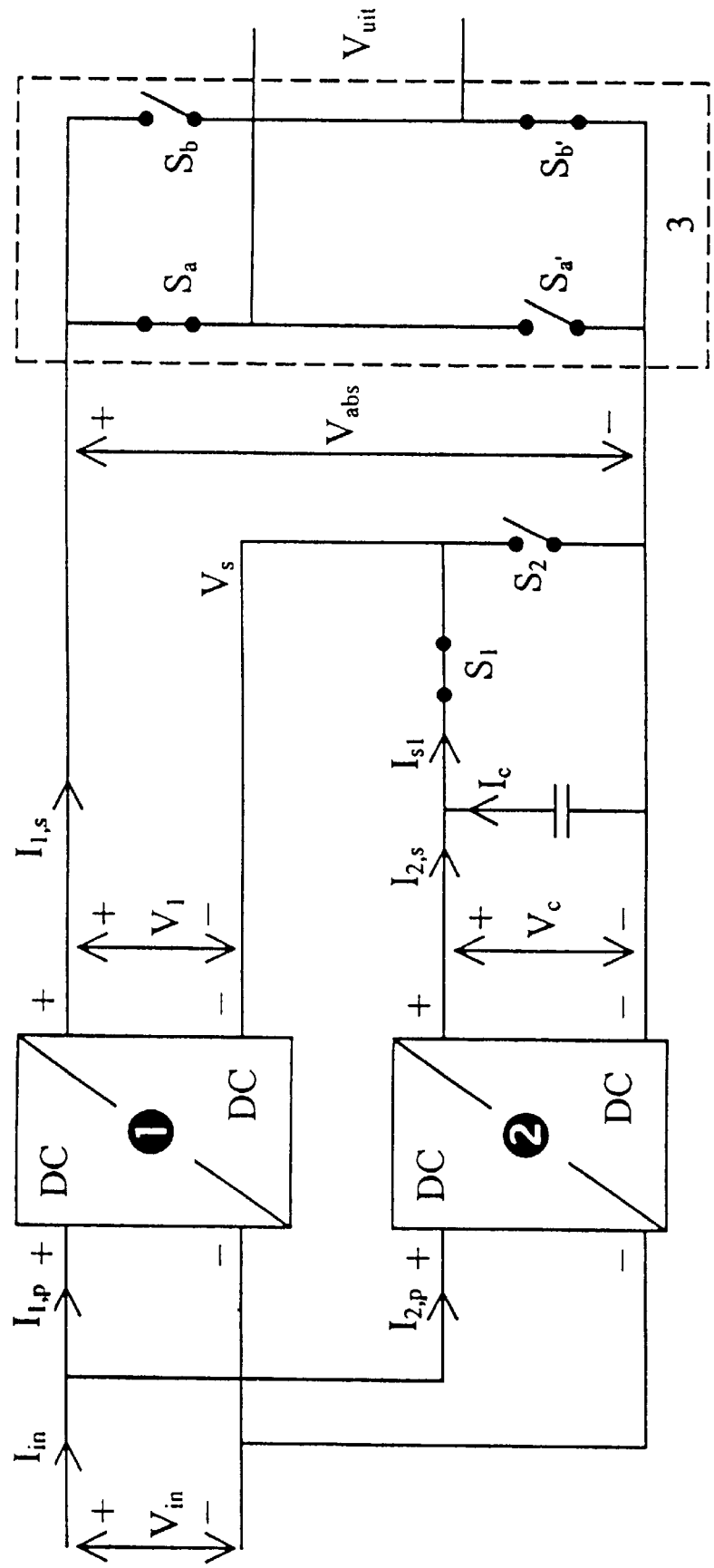

FIG. 4C shows a third state of the apparatus according to FIG. 1 for the case that $V_{abs} > V_c$. When this voltage condition is established by control unit 4, switch $S_1$ will be closed and switching element $S_2$ will be opened. As a result of this, the unfolding bridge will be connected to the series connection of the outputs of direct-current converters 1 and 2.

In this state of the apparatus, the outputs of direct-current converters 1, 2 are connected in series, and unfolding bridge 3 is connected to this series connection. The capacitor C which is connected to the output of the second direct-current converter 2, is incorporated in the output circuit, so that the power supplied to the output is supplied by direct-current converters 1 and 2 and capacitor C. Consequently, the power supplied by capacitor C is supplied directly to the output, thus ensuring an adequate efficiency of the converter apparatus. The entire power supplied to the output passes only one converter. The current supplied to the output is regulated by the control unit 4 by controlling direct-current converter 1.

Figure 4D:
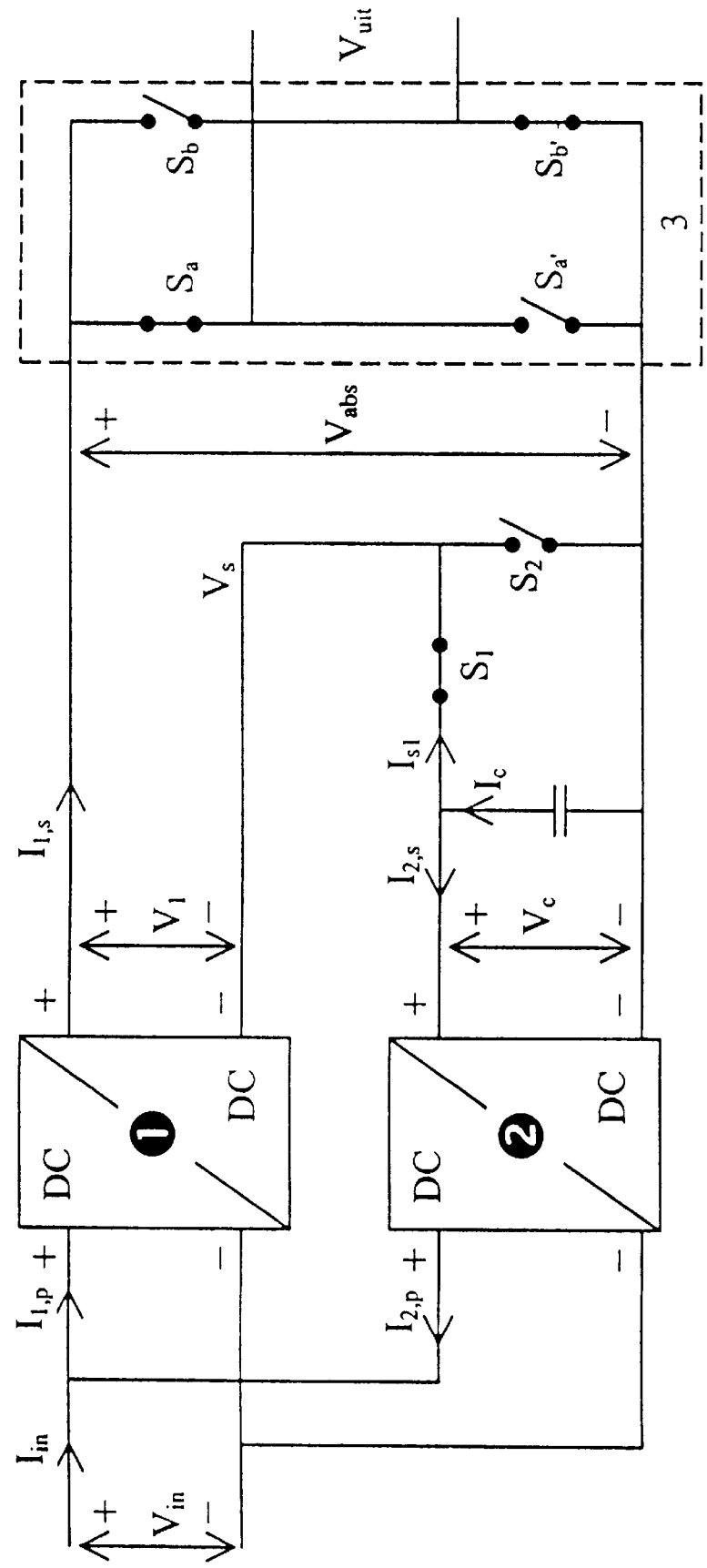

FIG. 4D finally shows a fourth possible state for the case that $V_{abs} > V_c$. In this state switch $S_1$ is still closed and switching element $S_2$ is still open. Also here the regulation of the current supplied to the output takes place by controlling the direct-current converter 1. The power is still supplied by converters 1 and 2 and capacitor C, but part of the power supplied by capacitor C is supplied to the output directly and part is supplied to the output via the two direct-current converters 1, 2. The efficiency of the apparatus is lower than in the states according to FIGS. 4A and 4C, since part of the power passes through more than one direct-current converter. This state can only occur when $V_c < V_{abs}/2$. Hereinafter it will become apparent that it is possible to dimension the apparatus disclosed herein so that the state according to FIG. 4D will only occur briefly, if at all.

It is noted that when the states according to FIG. 4B and/or FIG. 4D can occur, the direct-current converter 2 must be bidirectional.

The operation of the apparatus according to FIG. 1 can be explained in more detail with reference to FIGS. 5A–5G, 6A–6G and 7A–7G. FIG. 5 relates to the operation when the input voltage is relatively low, approx. 15 V. FIG. 6 relates to the operation when the input voltage has a nominal value of approx. 19 V, and FIG. 7 relates to the operation when the input voltage has a relatively high value of approx. 26 V.

Figure 5A:
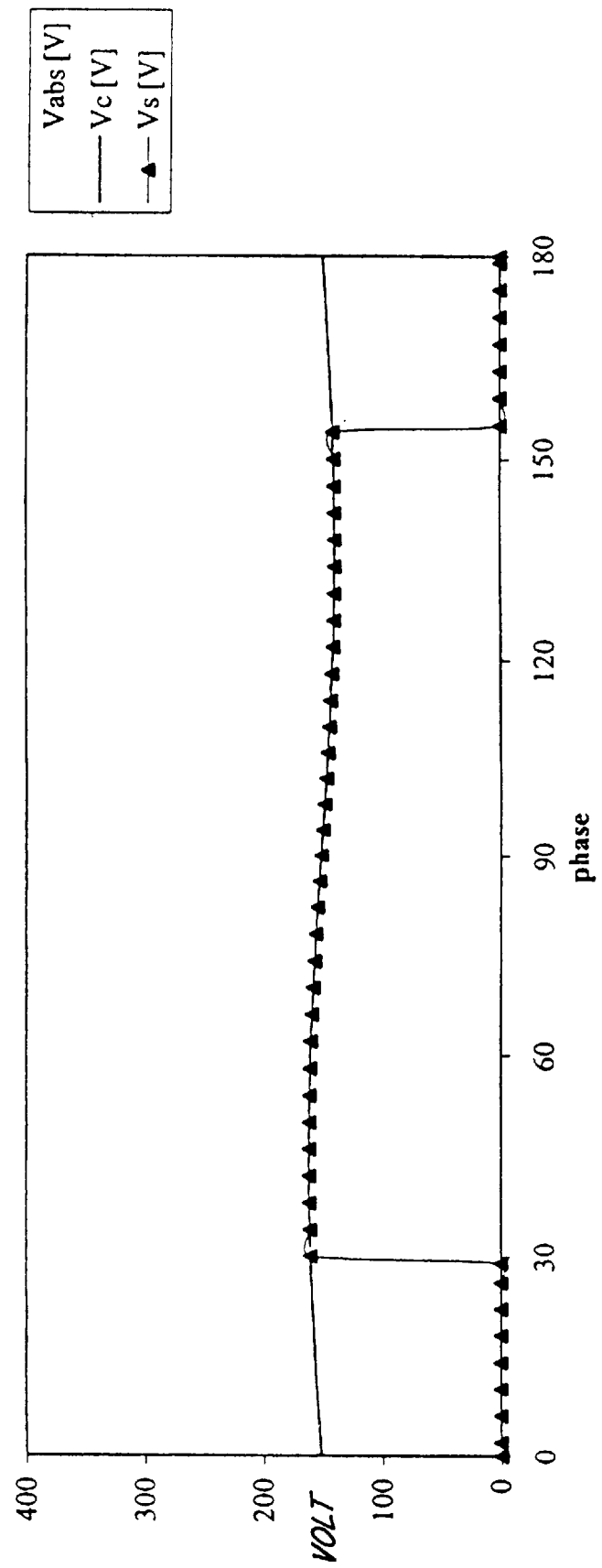
FIGS. 5A–5G, 6A–6G and 7A–7G are diagrams which illustrate the operation of the apparatus of FIG. 1.
Figure 5B:
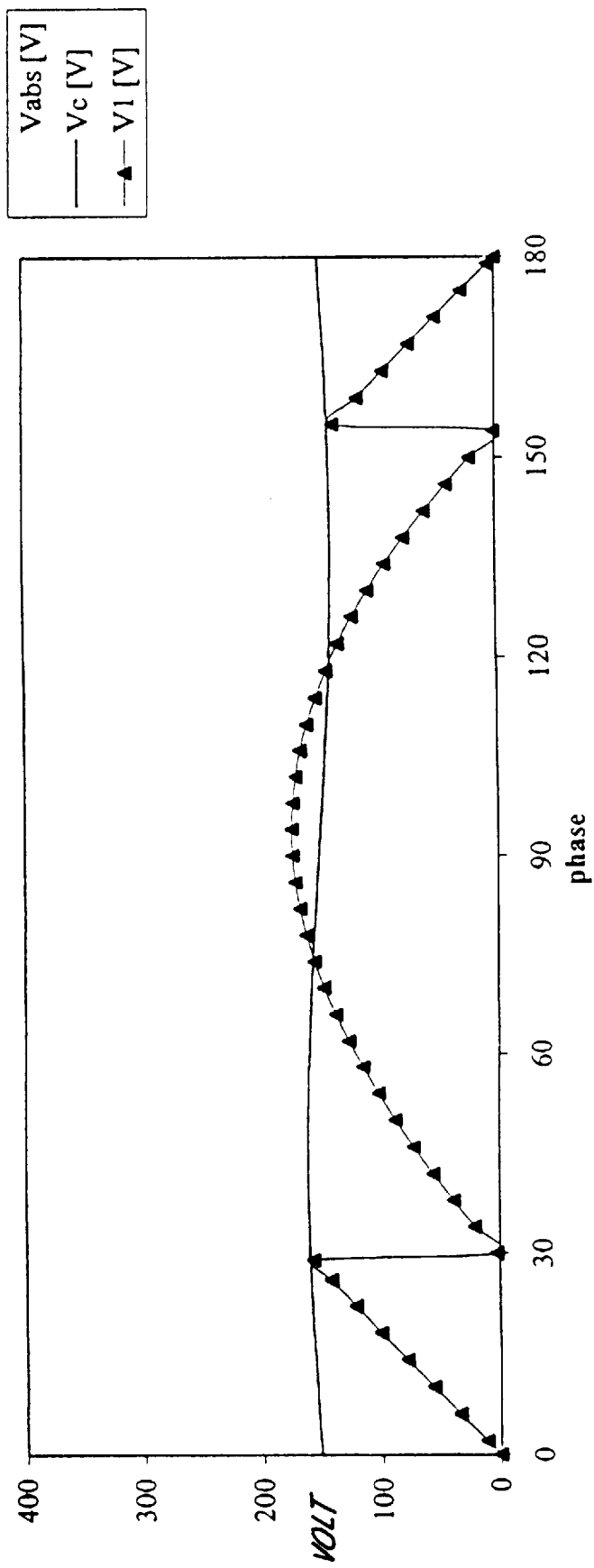
Figure 5C:
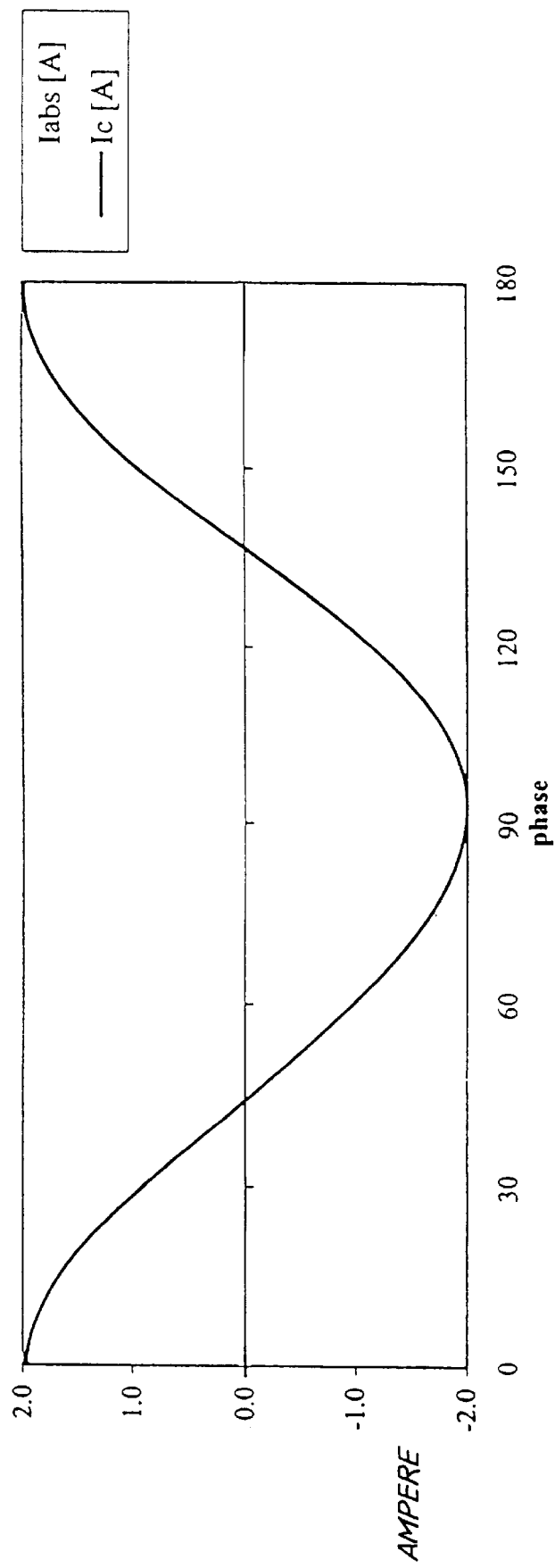
Figure 5D:
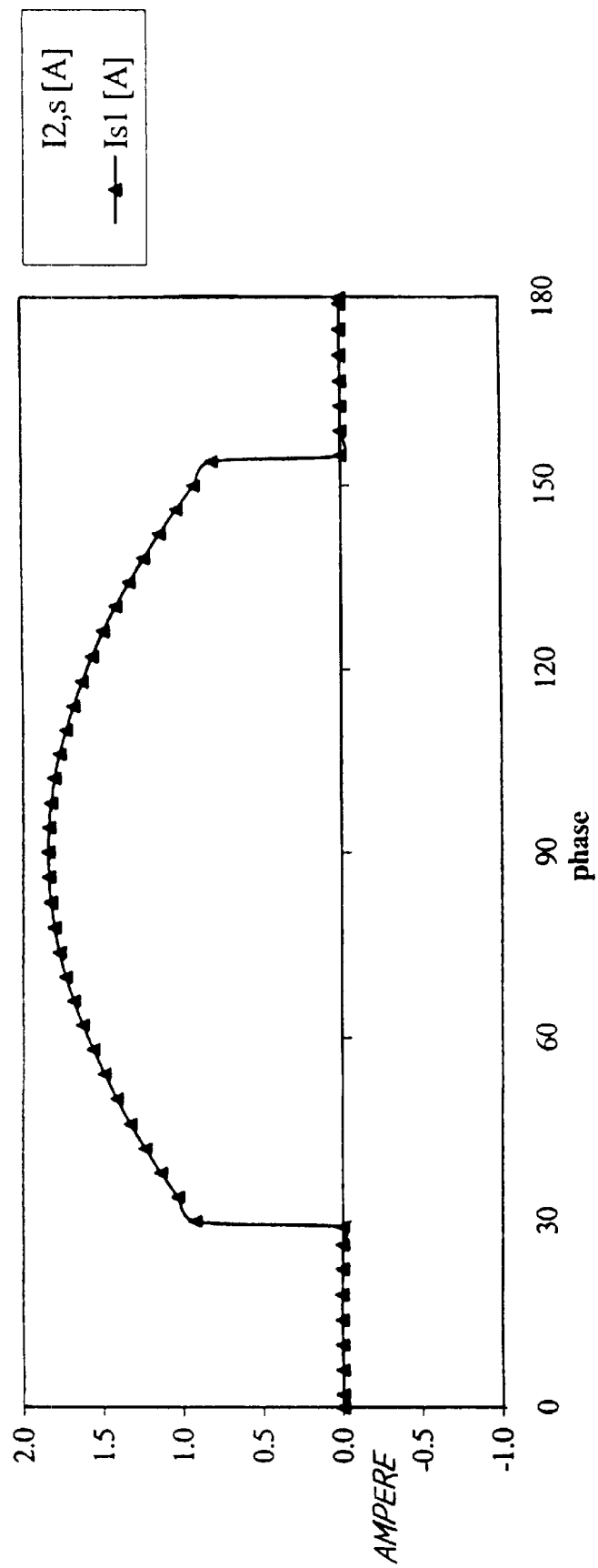
Figure 5E:
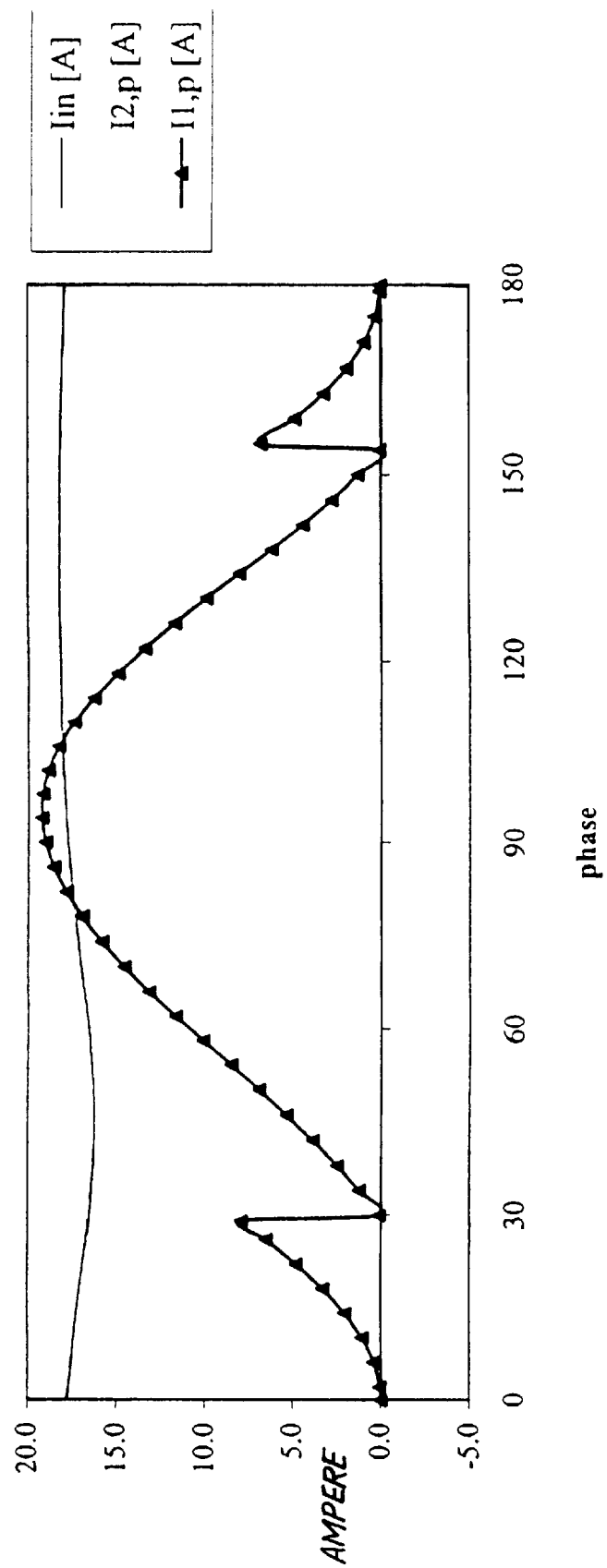
Figure 5F:
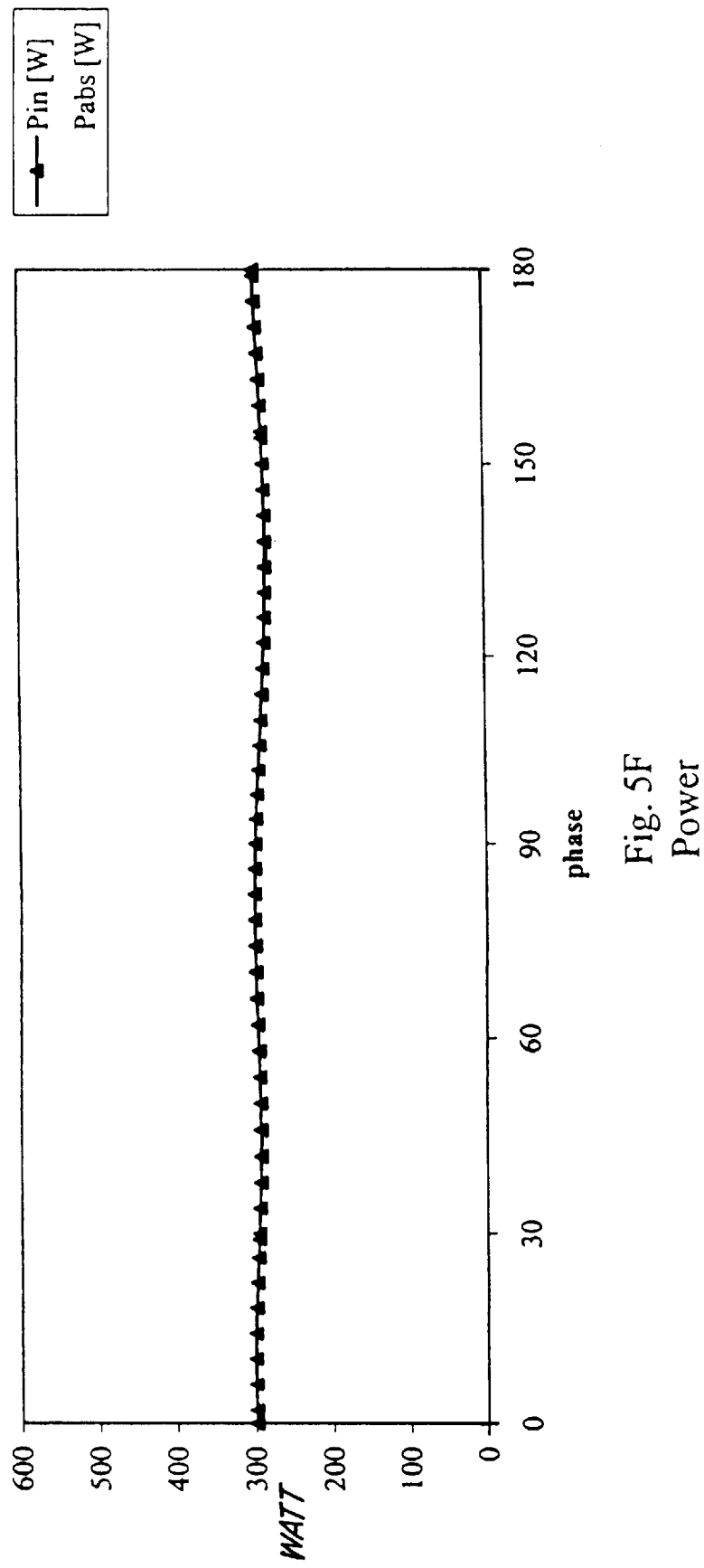
Figure 5G:
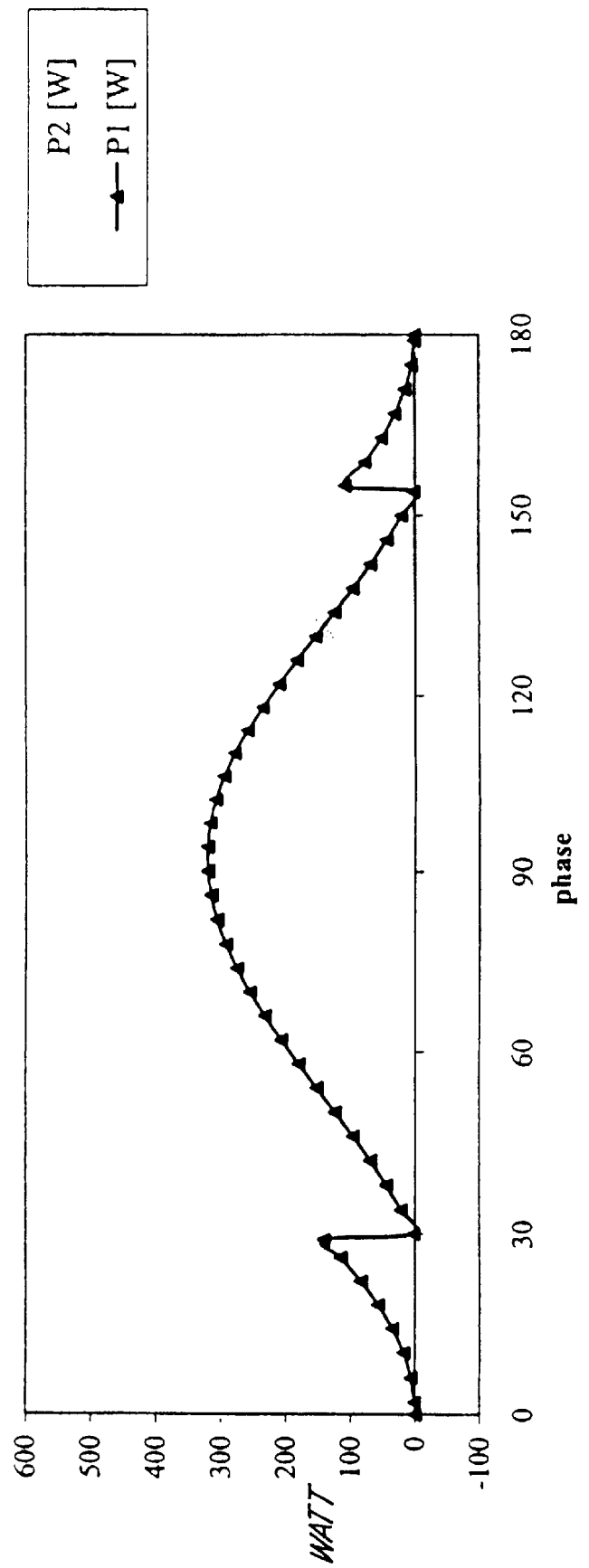
Figure 6A:
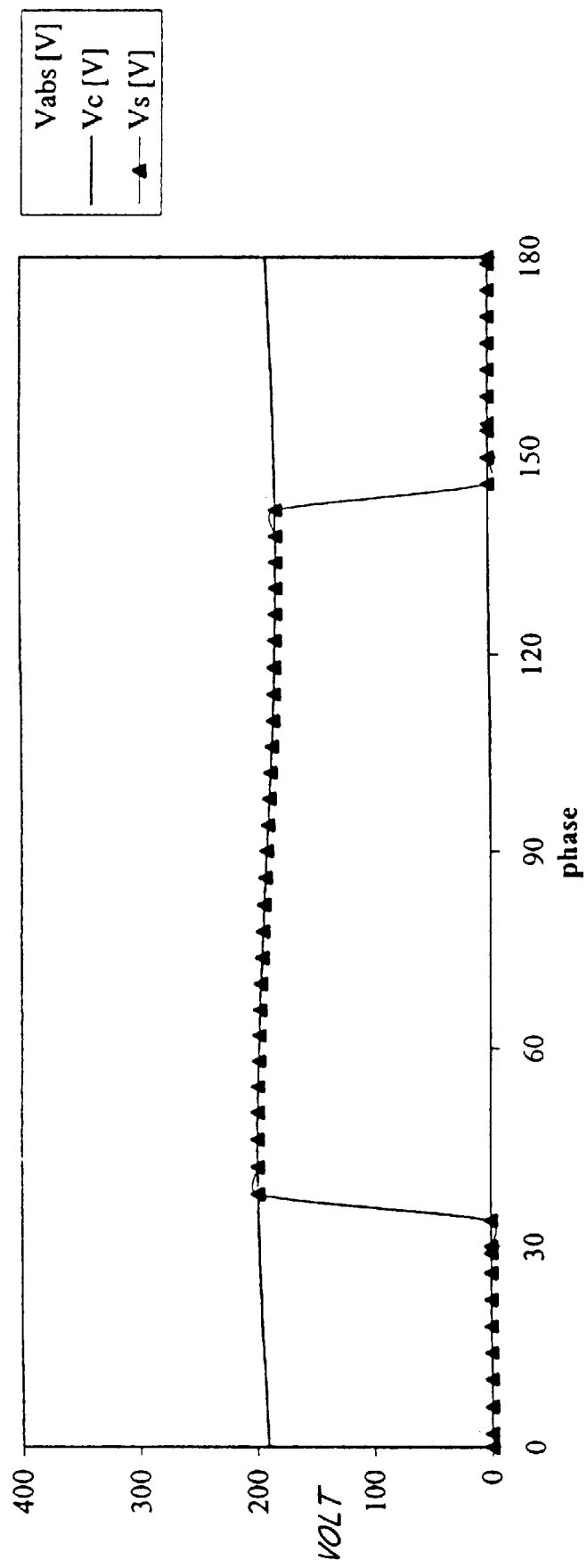
Figure 6B:
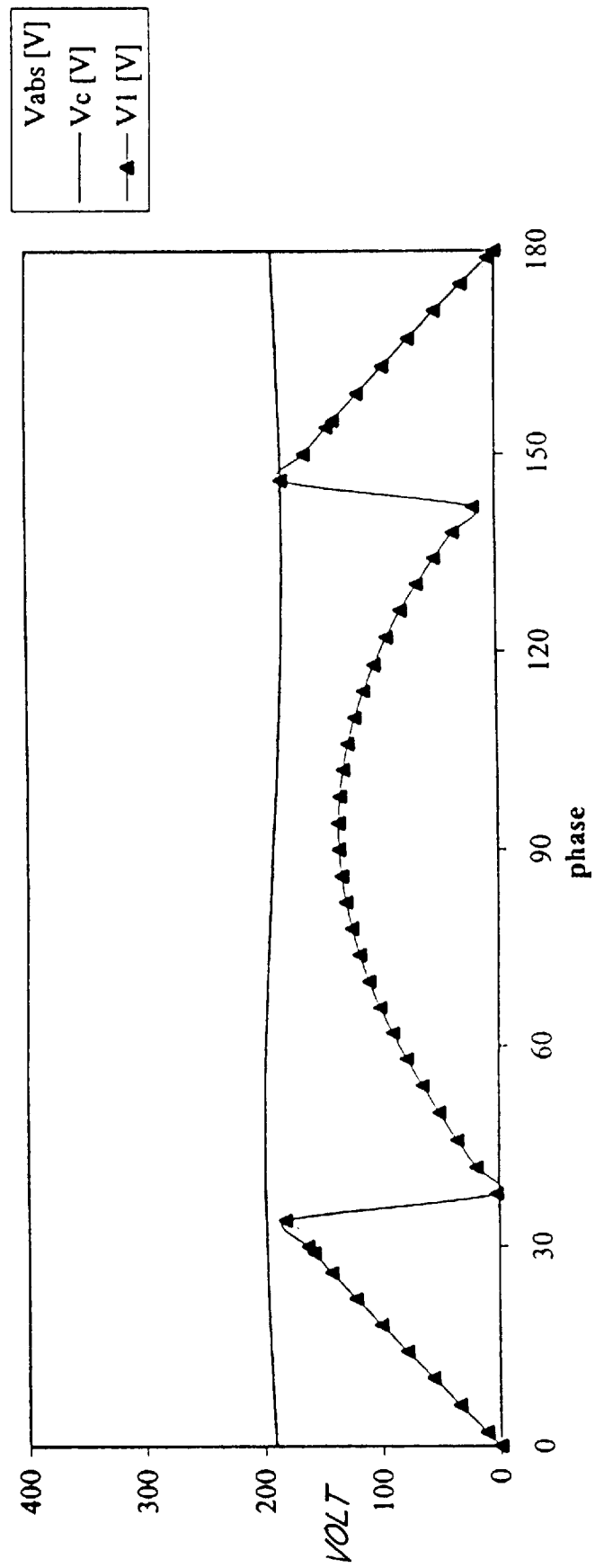
Figure 6C:
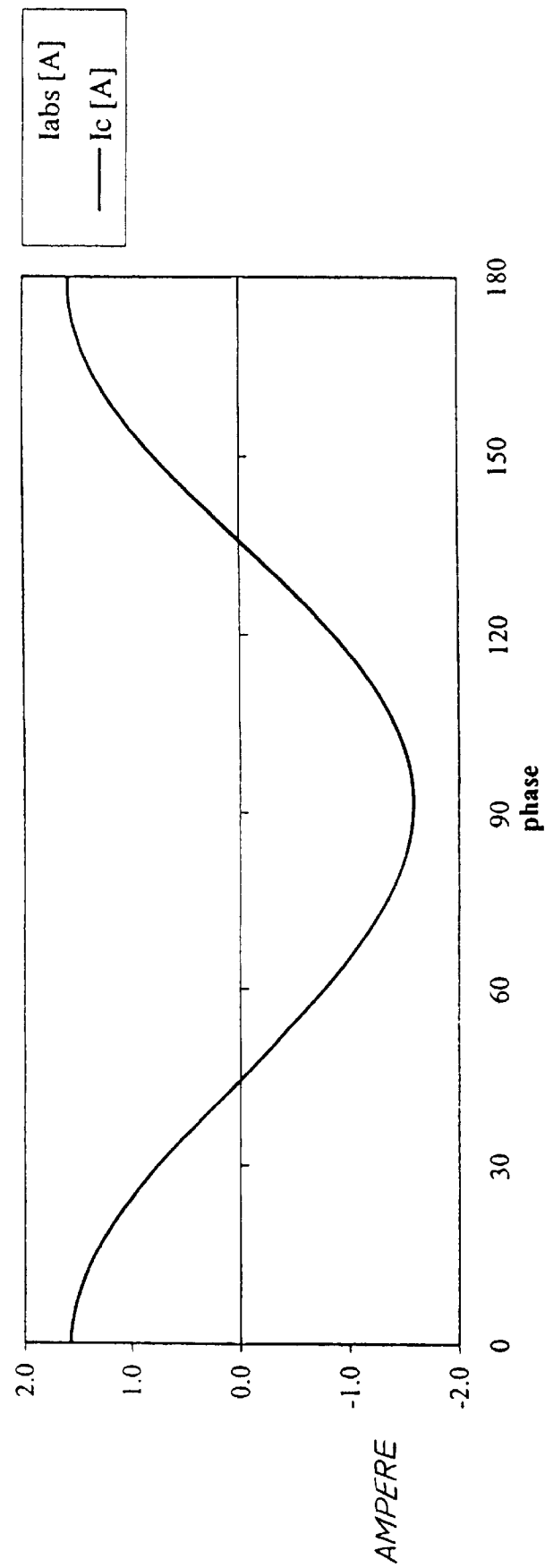
Figure 6D:
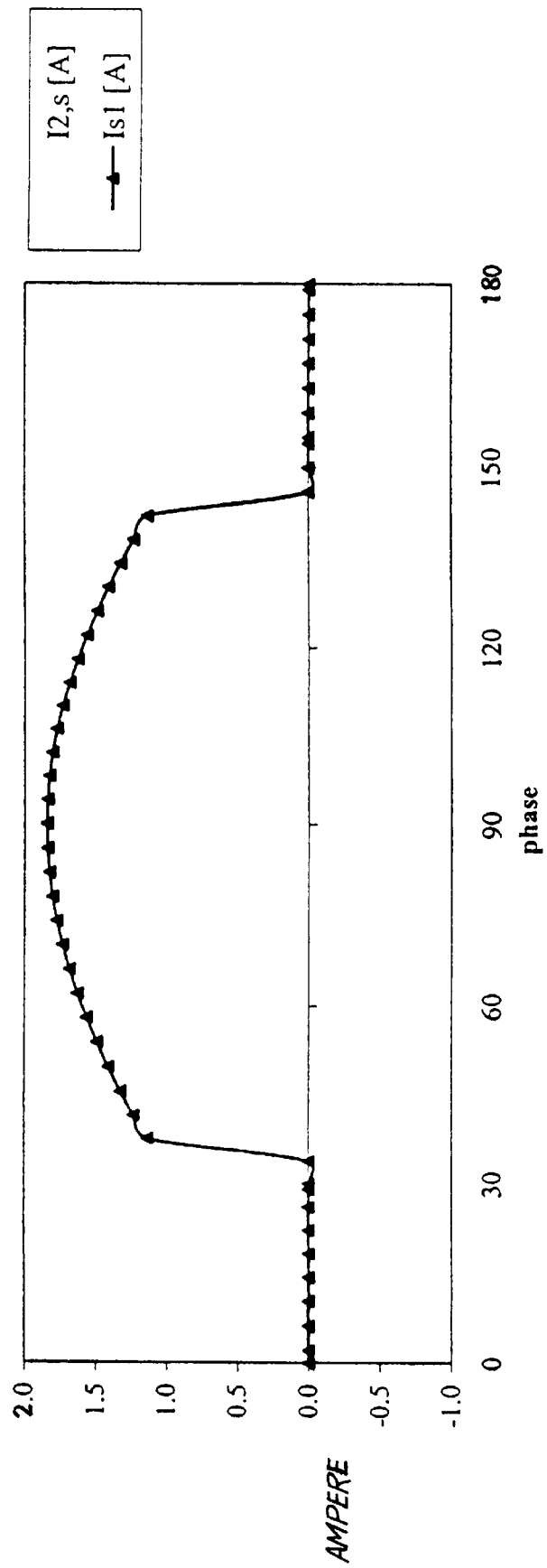
Figure 6E:
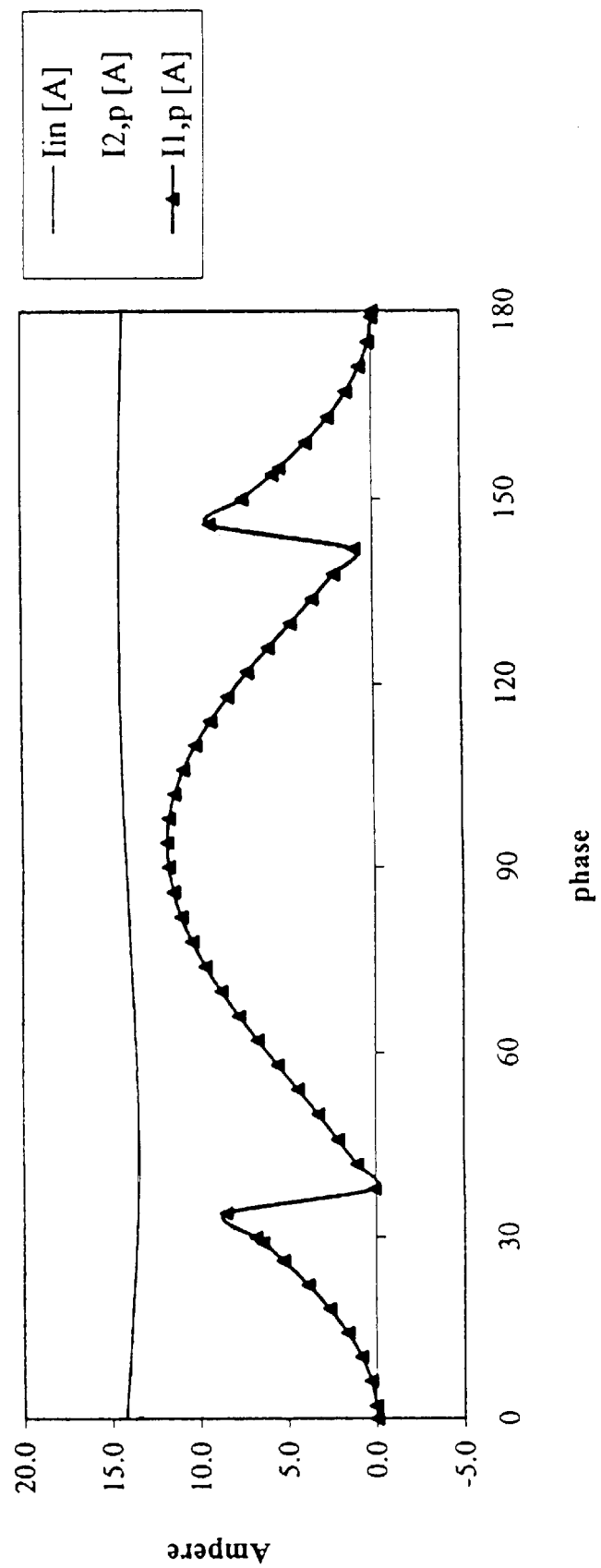
Figure 6F:
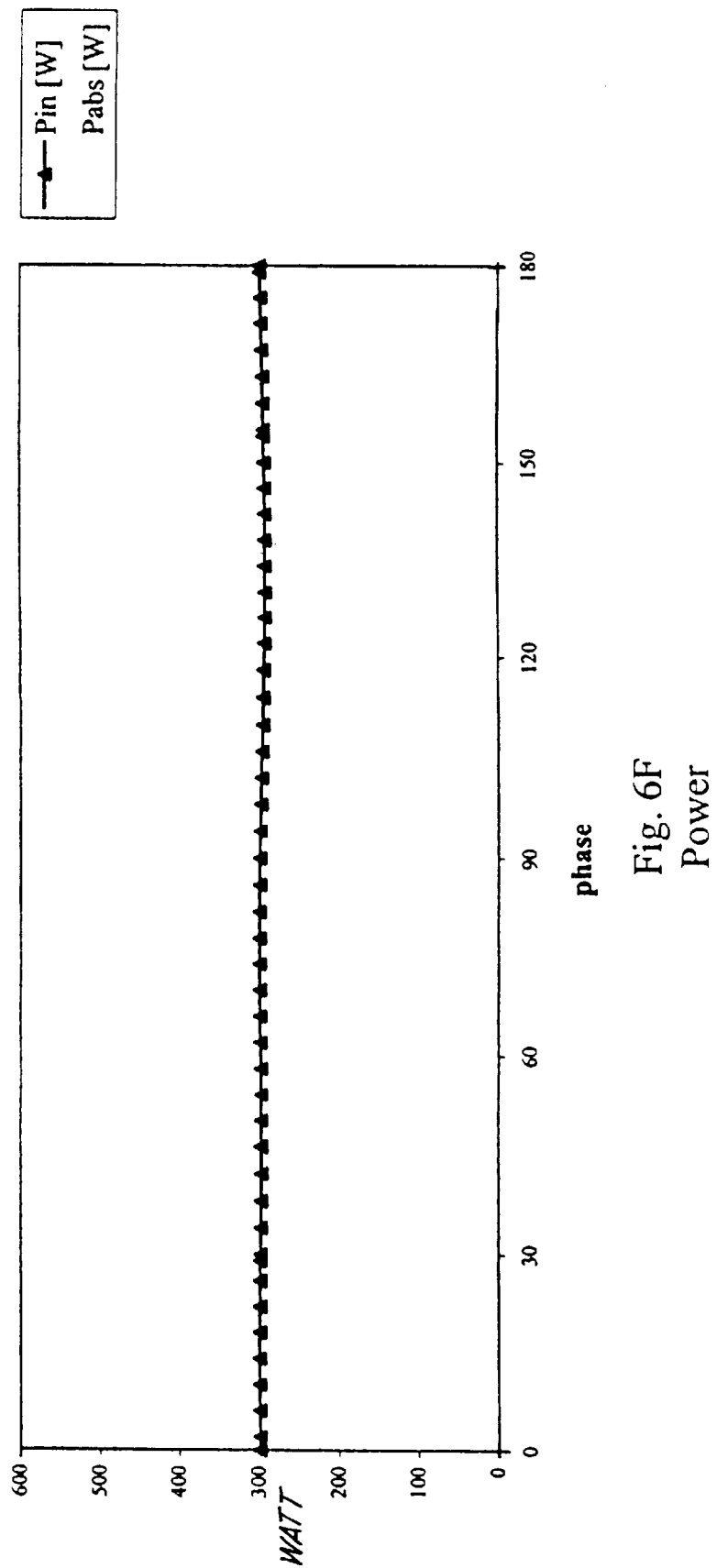
Figure 6G:
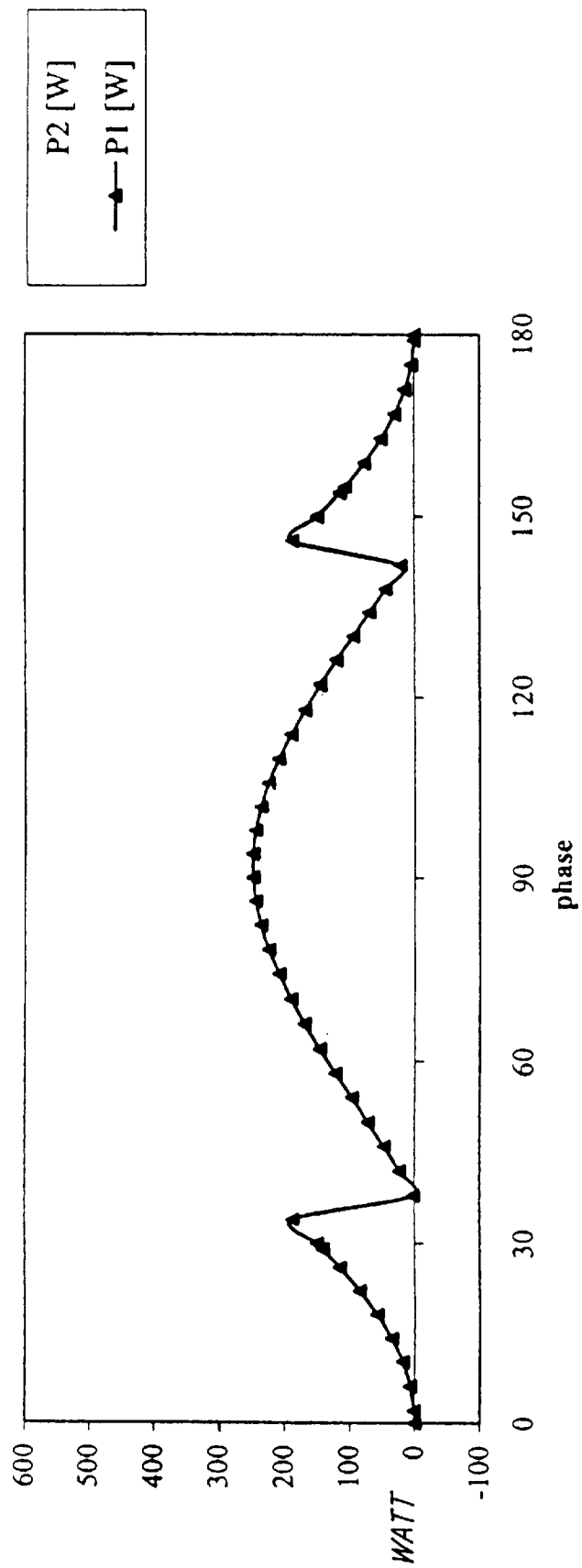
Figure 7A:
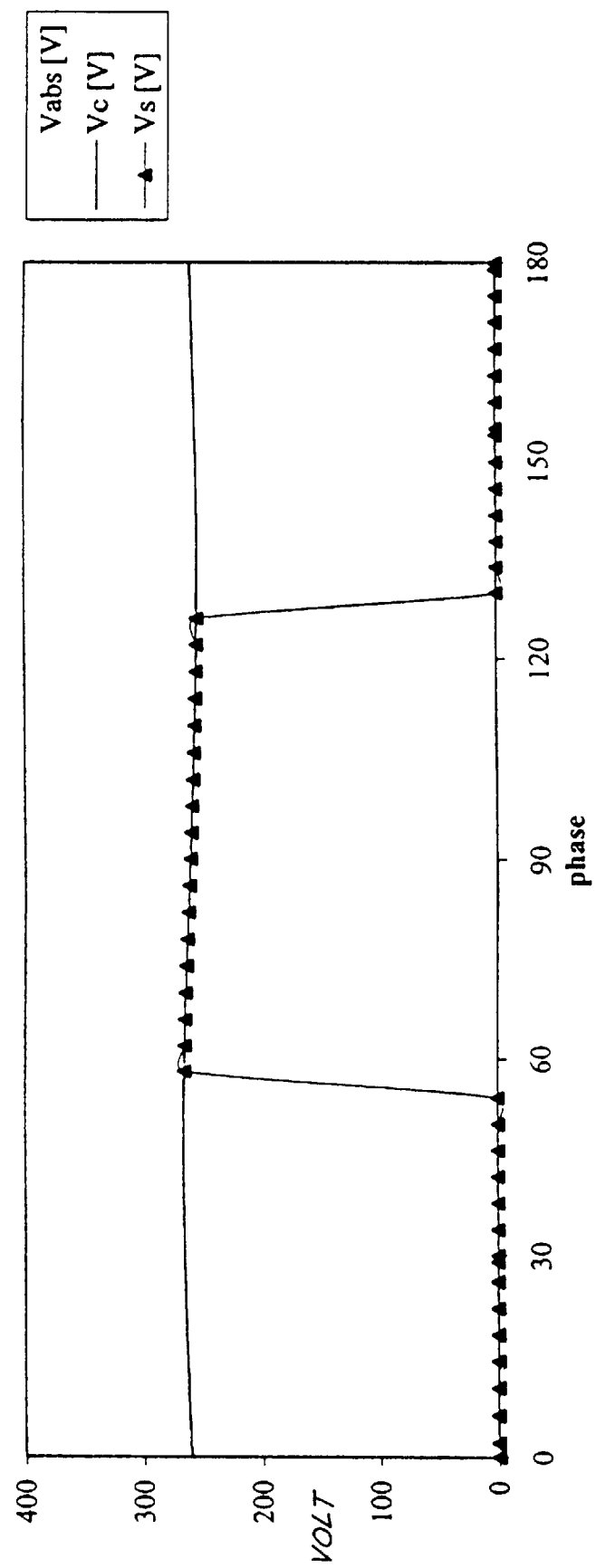
Figure 7B:
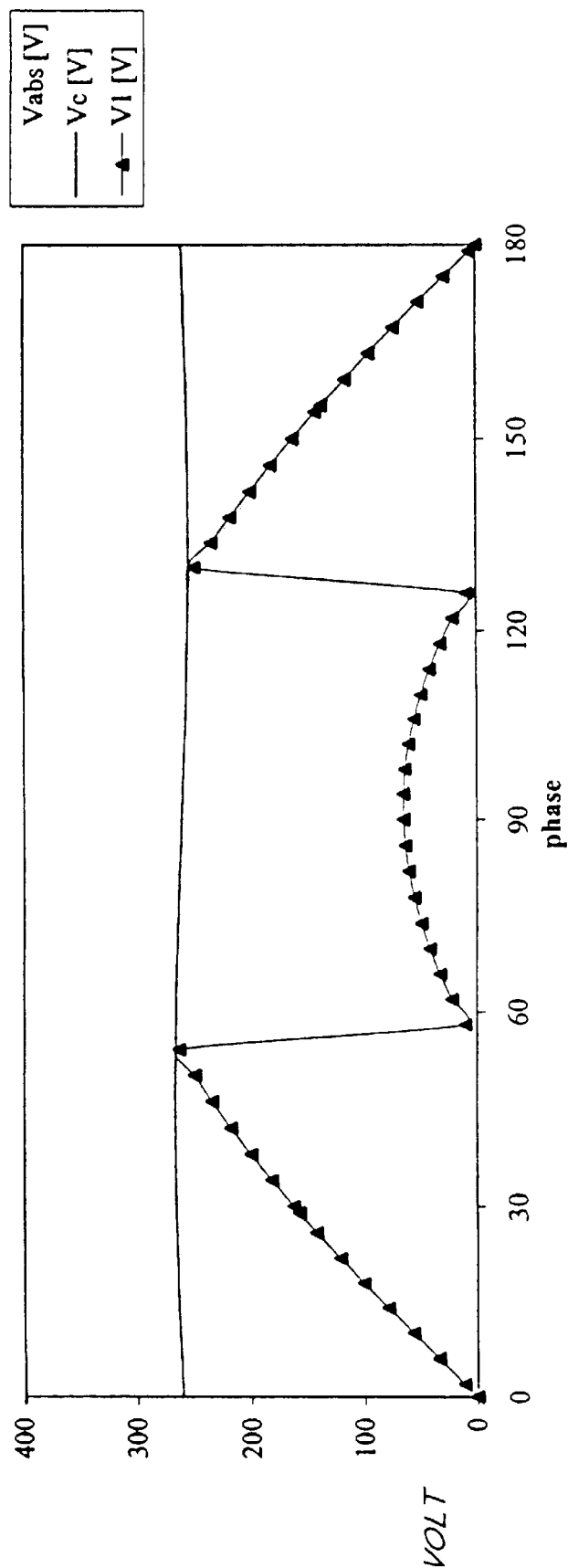
Figure 7C:
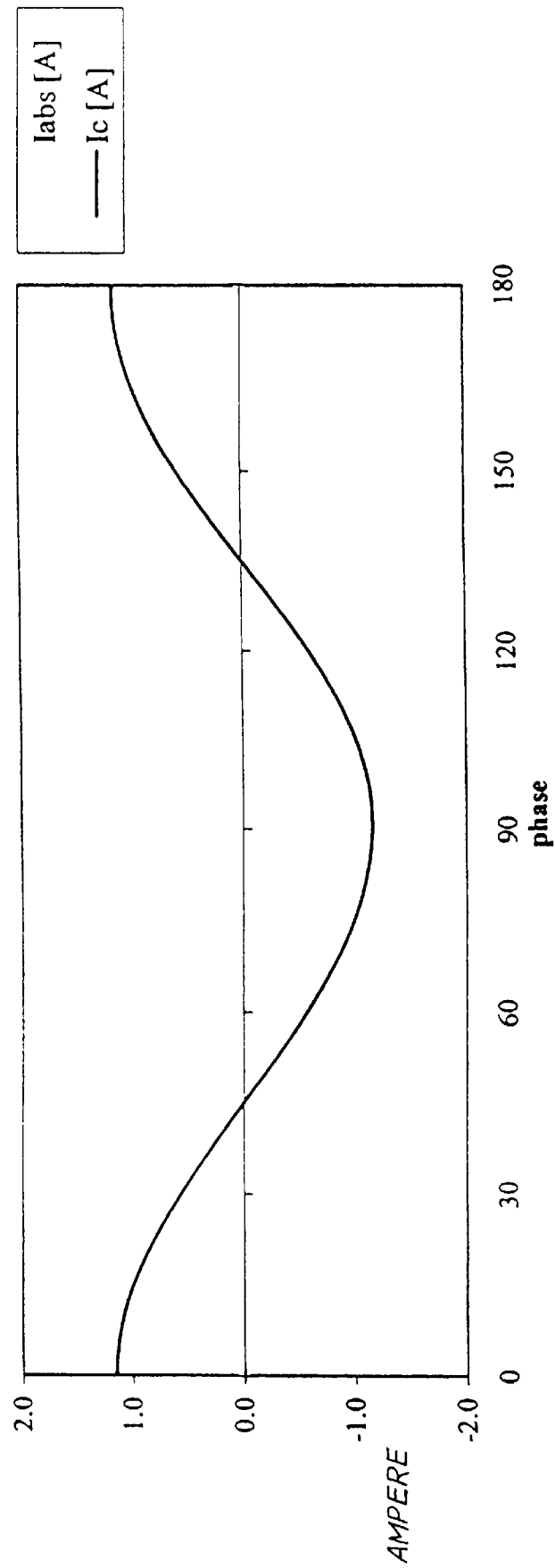
Figure 7D:
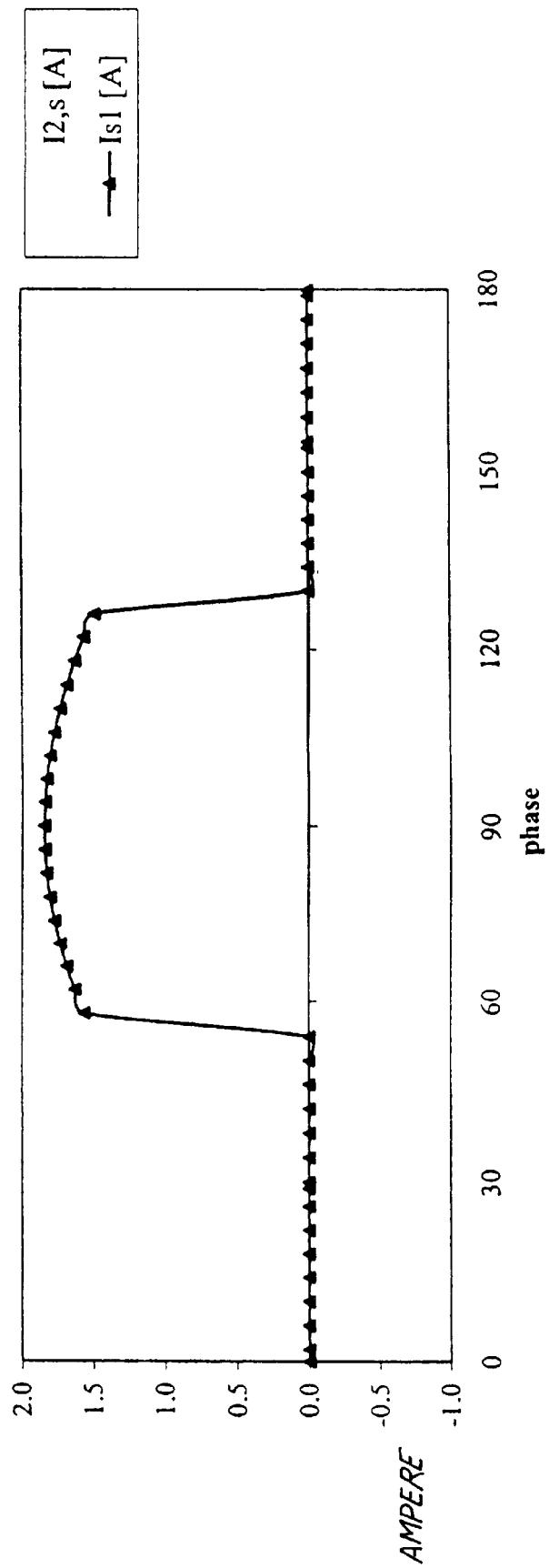
Figure 7E:
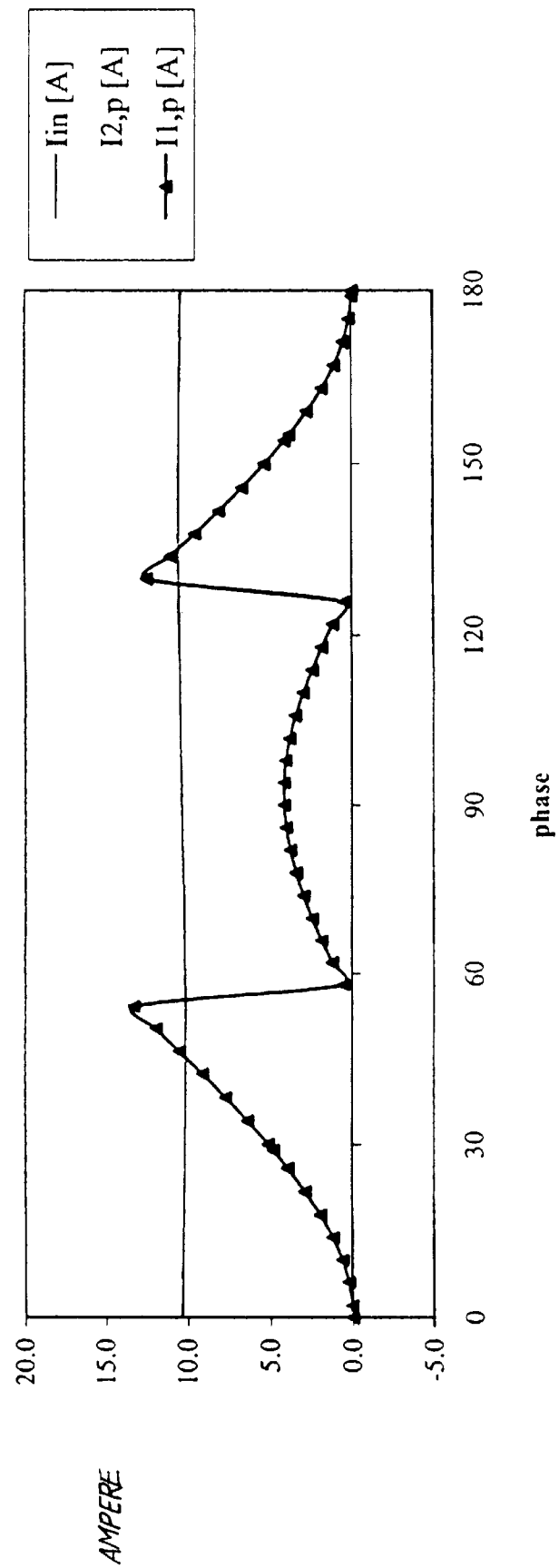
Figure 7F:
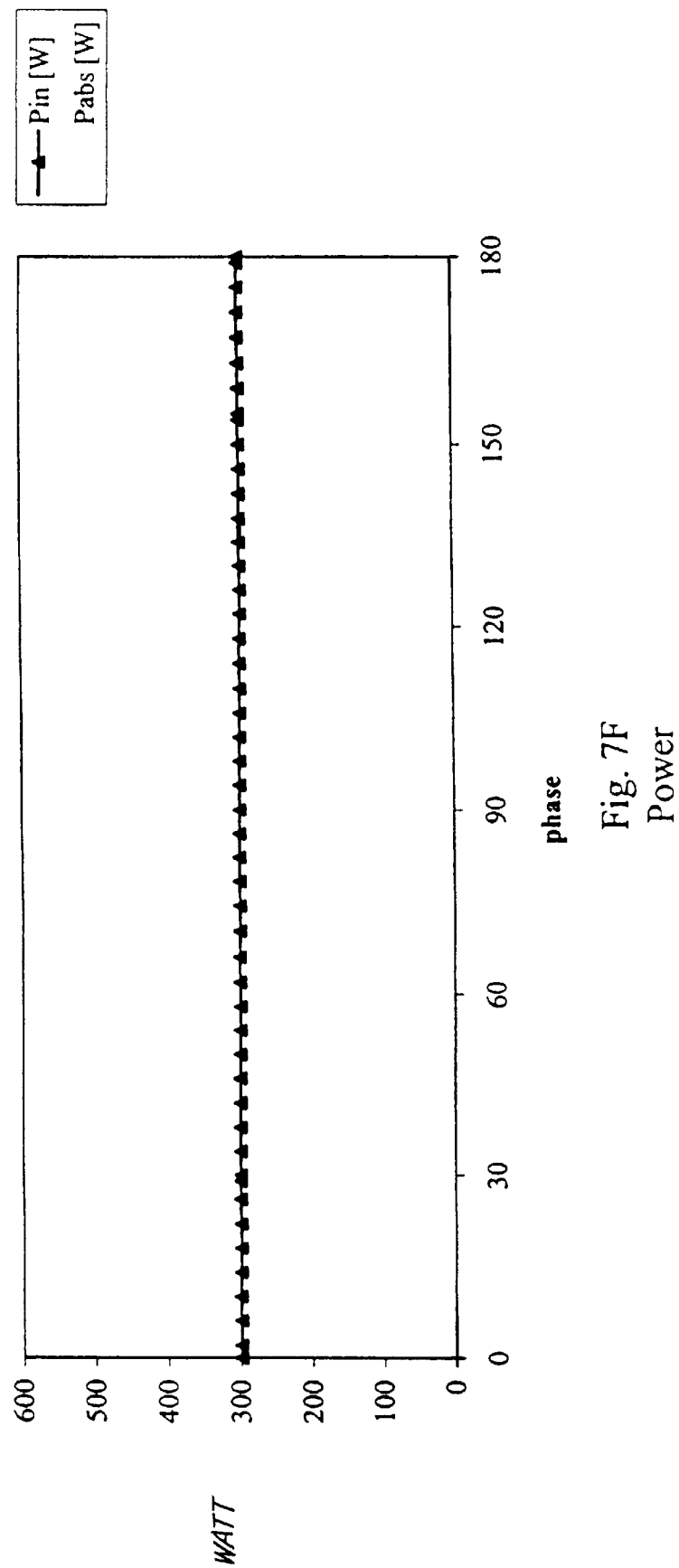
Figure 7G:
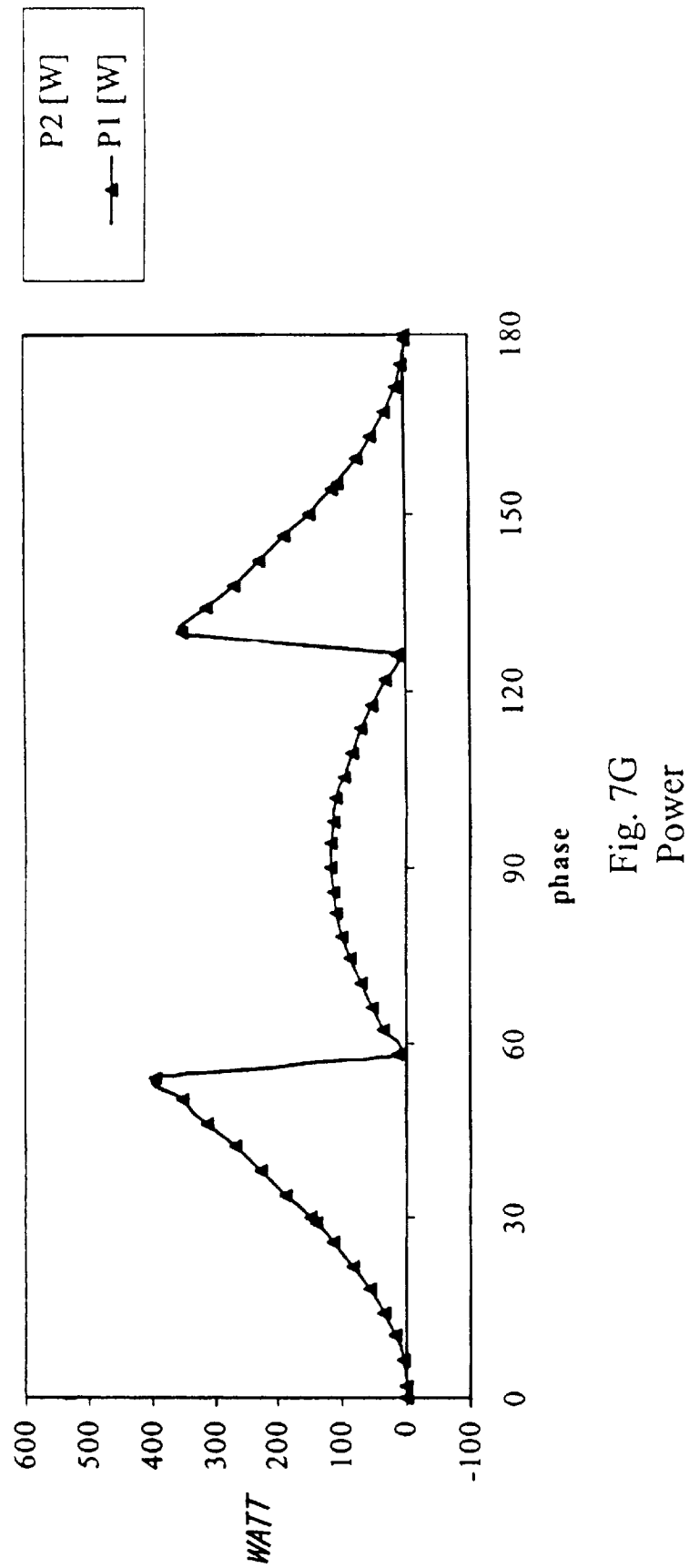

With regard to the conversion ratio N of direct-current converter 2 it applies that N=9, and consequently the capacitor voltage $V_c=\pm 135$ Volt when $V_{in}=15$ V. FIG. 5A shows that switch $S_1$ is closed as long as $V_{abs} < V_c$, wherein the voltage indicated at $V_s$ is zero. As soon as switch $S_1$ is closed, the output voltage $V_1$ will decrease to zero, as is shown in FIG. 5B, and current $I_{s1}$ will start to flow (see FIG. 5D). FIG. 5D furthermore shows the various states of FIGS. 4A, 4C and 4D at A, C and D, respectively. From this it appears that during the period in which the circuit is in the state as shown in FIG. 4D, the output current of direct-current converter $I_{2,a}$ is negative for a short period of time.

A comparison of FIGS. 5A–5G with FIGS. 6A–6G shows that when the nominal input voltage is 19 Volt, only the states according to FIGS. 4A and 4C can occur. When the input voltage is relatively high, the apparatus operates as shown in FIG. 7. From FIG. 7D it appears that the output voltage of direct-current converter $2I_{2,s}$ is negative for a short period in the state as shown in FIG. 4B.

The switching frequency of switches $S_1$ and $S_2$ equals twice the frequency of the output alternating current voltage, so that the switching losses of said switches are negligible. From FIGS. 5–7 it appears that when the conversion ratio of direct-current converter 2 is constant, a small, in practice often acceptable, ripple voltage and ripple current will be present at all times. They will only become zero when the capacity of capacitor C is of an infinite magnitude. It is indeed possible to reduce the ripple voltage and/or the ripple current to exactly zero, also when the value of capacitor C is of a practical magnitude, by making the conversion ratio N of direct-current converter 2 controllable over a small range. The control of direct-current converter 2 is carried out by control unit 4 thereby.

Figure 2:
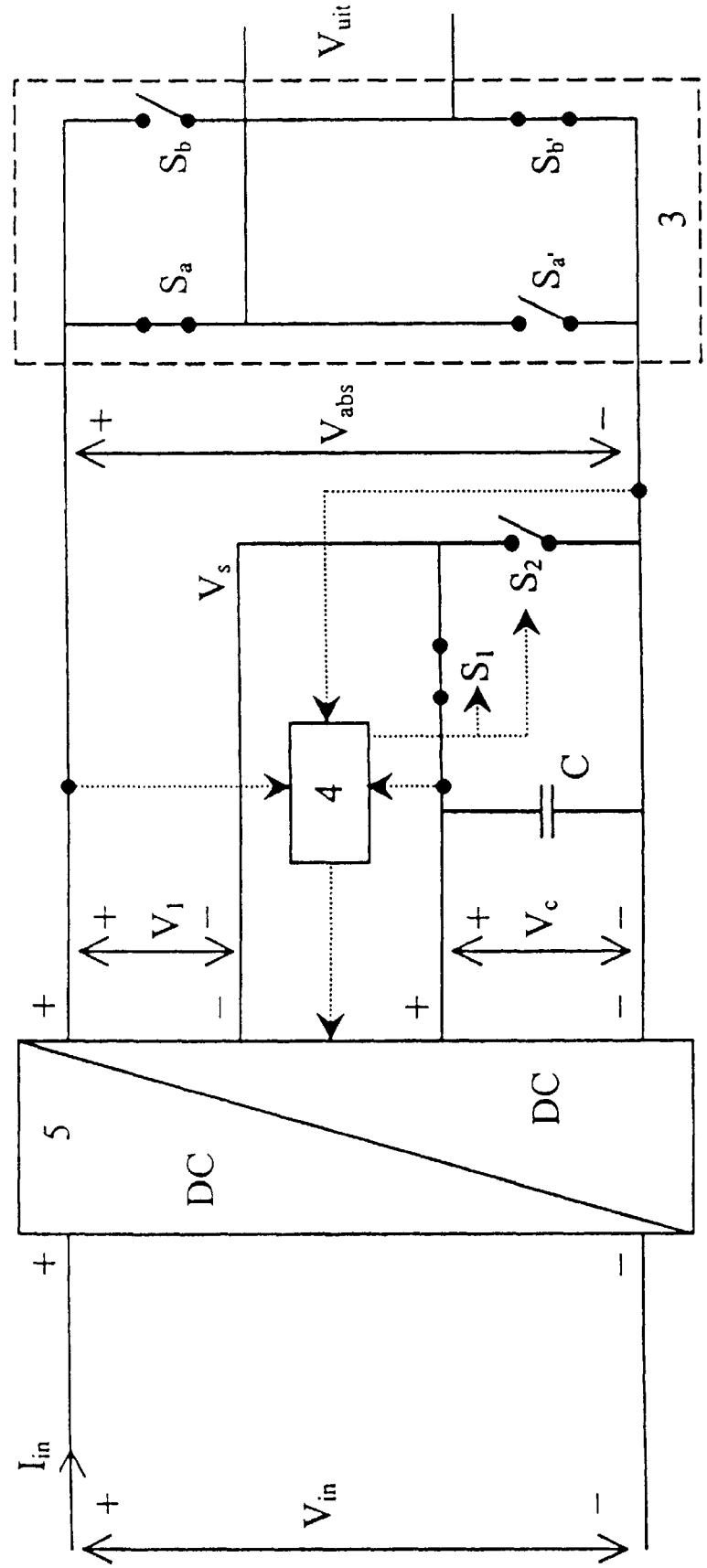
FIG. 2 is a simplified block diagram of a second embodiment of the apparatus according to the invention.

FIG. 2 shows an alternative embodiment of the apparatus disclosed herein, wherein the direct-current converters are combined into one converter 5 having one common input and two outputs, wherein one of said outputs, or both, are independently controllable. In fact the direct-current converters 1, 2 are configured to have a common transformer, which includes different secondary windings. The operation of this embodiment is the same as that of the embodiment of FIG. 1, so that a more detailed explanation will not be necessary.

Figure 3:
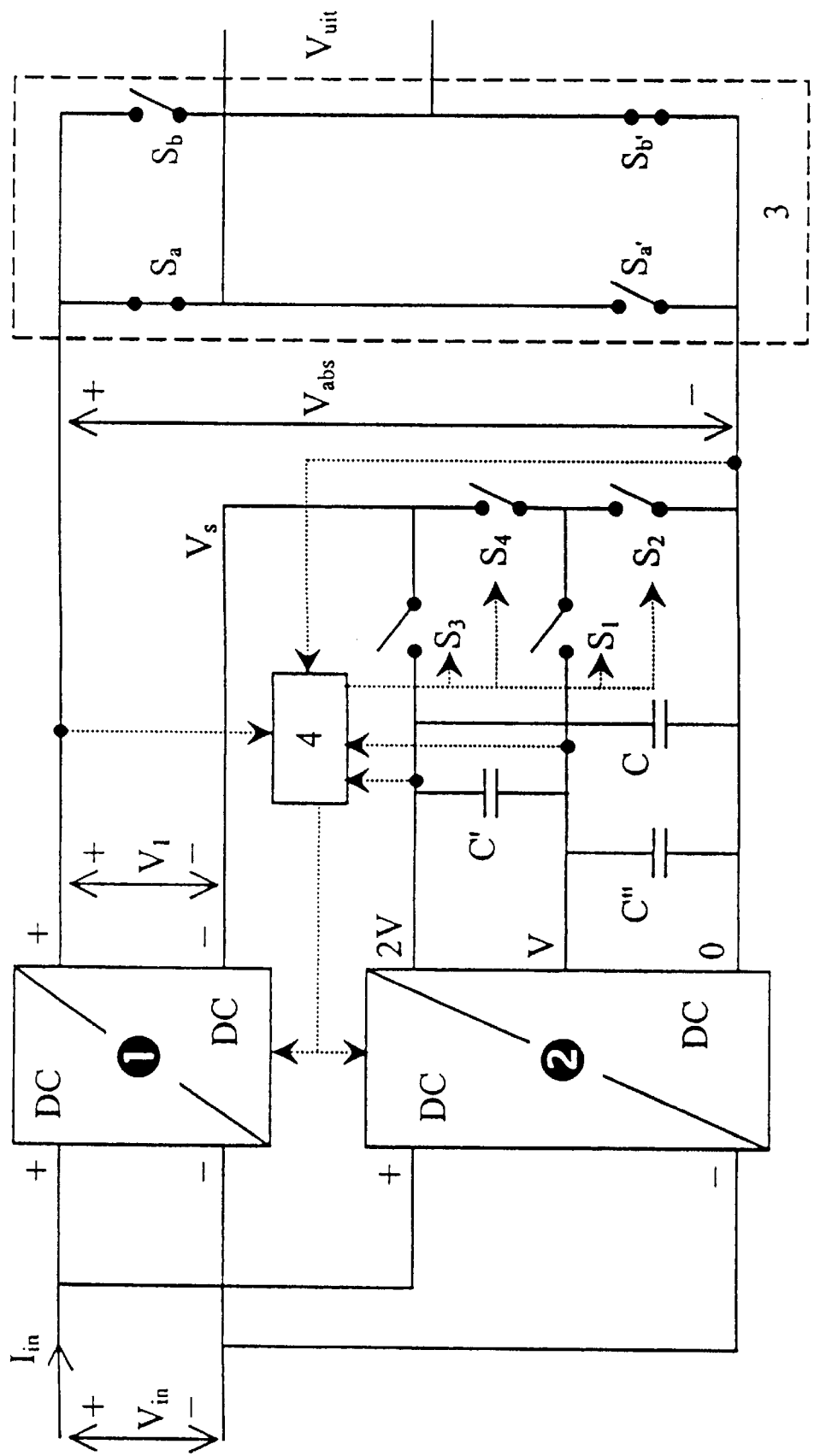
FIG. 3 is a simplified block diagram of a third embodiment of the apparatus according to the invention.

According to another embodiment of the invention, the second direct-current converter 2 may comprise several outputs, with FIG. 3 showing an example wherein two outputs are provided, which supply an output voltage V and 2V, respectively. The capacitor required for the energy storage may be connected in several places, as indicated at C, C' or C''. Furthermore it is possible to connect a combination of capacitors. The most effective embodiment is one wherein capacitor C is connected.

As is shown in FIG. 3, a respective switch $S_1$, $S_2$ is provided for each output, whilst two switching elements $S_2$ and $S_4$ are provided for connecting the unfolding bridge only to the output of direct-current converter 1. Switching elements $S_2$ and $S_4$ may be controllable switching elements, which are switched by control unit 4, or be configured as diodes. The switches $S_1$ and $S_3$ must be configured as controllable switches.

Figure 8:
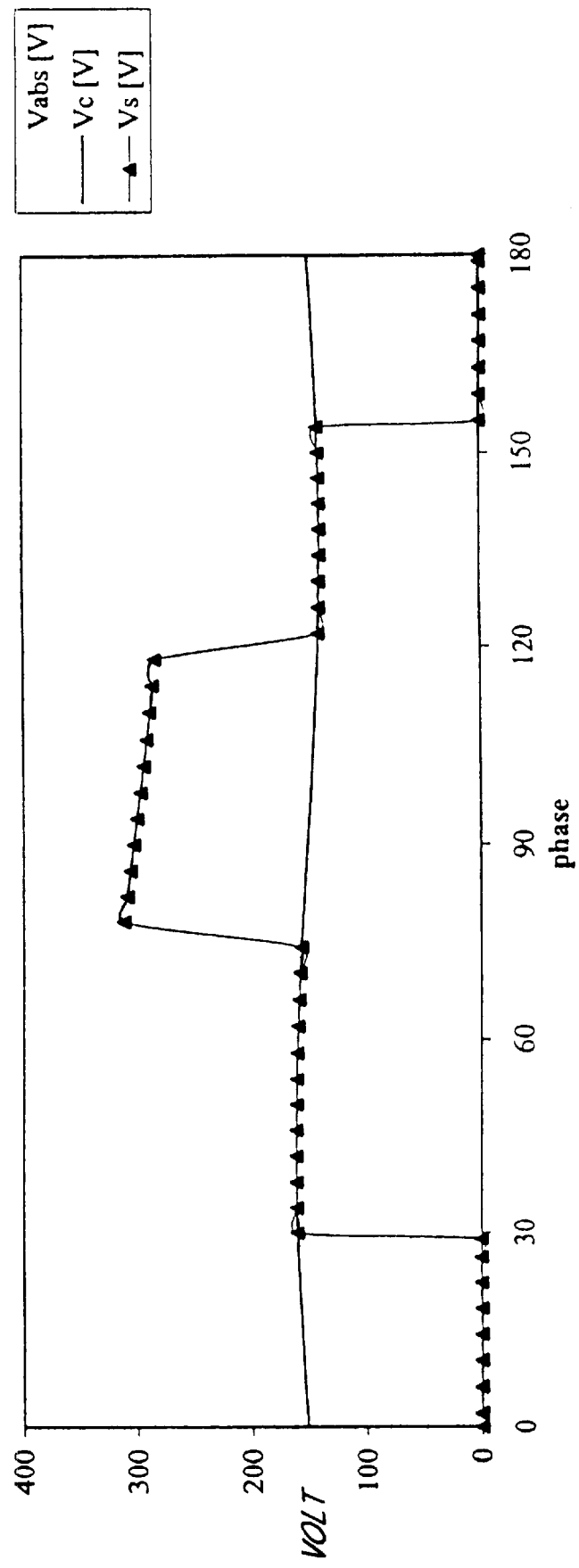
FIG. 8 shows a diagram which illustrates the operation of the apparatus of FIG. 3.

FIG. 8 shows the voltage $V_{abs}$, $V_c$ and $V_s$, from which it appears that the states of FIGS. 4B and 4D can be avoided altogether now.

It is noted that the apparatus disclosed herein is suitable for various applications. Thus the apparatus can be used for converting direct-current energy from solar panels, fuel cells and battery storage units into alternating current energy.

From the foregoing it will be apparent that the invention provides a conversion apparatus wherein a large energy storage can be realised, using a relatively small capacitor, by connecting the capacitor to the output of the second direct-current converter. The capacitor is connected in series to the output current for only part of each half period of the alternating current, so that almost the entire power will flow through one direct-current converter only, depending on the dimensions that are used. The switches which are used in the first direct-current converter may be dimensioned for a lower voltage, since the output voltage of the direct-current converter does not need to supply the peak value of the alternating current voltage. The second direct-current converter may be of simple design, since it need not be controllable, or only to a limited extent.

The invention is not limited to the above-described embodiments, which can be varied in several ways without departing from the scope of the invention.

What is claimed is:

1. Apparatus for converting a direct current into an alternating current, comprising a direct-current converter having an input and an output, which direct-current converter is continuously controllable, a capacitor, a control unit for controlling the direct-current converter, and an unfolding bridge, wherein a second direct-current converter having an input and an output is provided, the input of the second direct-current converter being connected in parallel to the input of the first direct-current converter and the outputs of the first and the second direct-current converter being connected in series, wherein the unfolding bridge is connected to the series-connected outputs of the direct-current converters and the capacitor is connected to the output of the second direct-current converter, wherein a first switching element is provided for interrupting the series connection and a second switching element is provided for connecting the unfolding bridge to the output of the first direct-current converter in the interrupted state of the series connection, wherein the control unit controls at least the first switching element in dependence on the voltage $V_c$ across the capacitor and the voltage $v_{abs}$ across the unfolding bridge, in such a manner that the first switching element is opened when $V_{abs} < V_c$.

2. Apparatus according to claim 1, wherein the two direct-current converters have one common transformer comprising different secondary windings.

3. Apparatus according to claim 1, wherein the second direct-current converter has at least two outputs, wherein each output of the second direct-current converter can be connected in series to the output of the first direct-current converter by means of an associated first switching element, and a second switching element is provided for each output of the second direct-current converter for connecting the unfolding bridge to the output of the first direct-current converter in the interrupted state of the series connection.

4. Apparatus according to claim 2, wherein the second direct-current converter has at least two outputs, wherein each output of the second direct-current converter can be connected in series to the output of the first direct-current converter by means of an associated first switching element, and a second switching element is provided for each output of the second direct-current converter for connecting the unfolding bridge to the output of the first direct-current converter in the interrupted state of the series connection.

5. Apparatus according to claim 1, wherein the second direct-current converter is controllable over a limited range.

6. Apparatus according to claim 1, wherein the second direct-current converter is a bidirectional converter.

* * * * *

UNITED STATES PATENT AND TRADEMARK OFFICE
CERTIFICATE OF CORRECTION

| | |
|---|---|
| PATENT NO. | : 6,151,234 |
| DATED | : November 21, 2000 |
| INVENTOR(S) | : Hendrik Oldenkamp |

It is certified that error appears in the above-identified patent and that said Letters Patent is hereby corrected as shown below:

Insert -- [30] Foreign Application Priority Data
March, 8, 1999     [NL]     Netherlands     1011483 --.

Signed and Sealed this

Twenty fifth Day of September, 2001

*Attest:*

*Nicholas P. Godici*

NICHOLAS P. GODICI
*Attesting Officer*     *Acting Director of the United States Patent and Trademark Office*